US012722524B2

(12) United States Patent
Chen et al.

(10) Patent No.: US 12,722,524 B2
(45) Date of Patent: Sep. 1, 2026

(54) BATTERY SWAP APPARATUS AND BATTERY SWAP SYSTEM

(71) Applicant: CONTEMPORARY AMPEREX TECHNOLOGY (HONG KONG) LIMITED, Hong Kong (CN)

(72) Inventors: Disong Chen, Ningde (CN); Yuanhe Wu, Ningde (CN); Qingfeng Ye, Ningde (CN); Ling Shuai, Ningde (CN); Xin Yang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 381 days.

(21) Appl. No.: 18/499,476

(22) Filed: Nov. 1, 2023

(65) Prior Publication Data

US 2024/0059259 A1 Feb. 22, 2024

Related U.S. Application Data

(63) Continuation of application No. PCT/CN2022/123425, filed on Sep. 30, 2022.

(30) Foreign Application Priority Data

Nov. 10, 2021 (CN) ......................... 202122749834.0

(51) Int. Cl.
*B60L 53/80* (2019.01)
*B60K 1/04* (2019.01)
*B60S 5/06* (2019.01)

(52) U.S. Cl.
CPC ................. *B60L 53/80* (2019.02); *B60S 5/06* (2013.01); *B60K 2001/0472* (2013.01)

(58) Field of Classification Search
CPC ..... B60K 2001/0472; B60L 53/80; B60S 5/06
See application file for complete search history.

(56) References Cited

U.S. PATENT DOCUMENTS 5,538,809 A 7/1996 Bittihn et al.
2011/0223459 A1 9/2011 Heichal

FOREIGN PATENT DOCUMENTS

CN 106926825 A 7/2017
CN 107959144 A 4/2018
(Continued)

OTHER PUBLICATIONS

Written Opinion dated May 27, 2025 for application JP 2024-500590.

(Continued)

*Primary Examiner* — James Keenan
(74) *Attorney, Agent, or Firm* — Ladas & Parry LLP

(57) ABSTRACT

A battery swap apparatus and a battery swap system relating to the field of battery swap for electrical devices is disclosed. The battery swap apparatus includes a floating platform, a locking and unlocking mechanism and an positioning mechanism. The locking and unlocking mechanism is arranged on the floating platform, and the positioning mechanism is arranged on the floating platform. The positioning mechanism includes a positioning member and a driving member. The driving member is configured to drive the positioning member to move in a height direction of the battery swap apparatus, so as to adjust the height of the positioning member. The driving member drives the positioning member to move downwardly to reduce the height of the positioning member The driving member drives the positioning member to move upwardly to increase the height of the positioning member.

10 Claims, 11 Drawing Sheets

(56) References Cited

FOREIGN PATENT DOCUMENTS

| | | | | |
|---|---|---|---|---|
| CN | 108032844 | A | 5/2018 | |
| CN | 108058688 | A | 5/2018 | |
| CN | 109927682 | A | 6/2019 | |
| CN | 110217207 | A | 9/2019 | |
| CN | 216101652 | U | 3/2022 | |
| CN | 216101653 | U | 3/2022 | |
| EP | 3705361 | A1 | 5/2019 | |
| EP | 3725607 | A1 | 6/2019 | |
| EP | 3778323 | A1 | 10/2019 | |
| EP | 3715194 | A1 | 9/2020 | |
| EP | 4321396 | A1 | 2/2024 | |
| JP | 2020508930 | A | 3/2020 | |
| WO | WO-2013144955 | A2 * | 10/2013 | ............. B60L 53/65 |
| WO | 2018090668 | A1 | 5/2018 | |

OTHER PUBLICATIONS

Decision to Grant a Patent dated Sep. 2, 2025 for application JP 2024-500590.
Supplemental Partial European Search Report for Application No. 222891694.6, mailed on Jul. 22, 2024, 9 pages.
Supplemental Partial European Search Report for Application No. 22891694.6, mailed on Jul. 22, 2024, 9 pages.
Notice of Reasons for Refusal dated Feb. 4, 2025 for application JP 2024-500590.
Extended European Search Report for Application No. 22891694.6, mailed on Nov. 13, 2024, 12 pages.
Supplemental Partial European Search Report for Application No. 222891694, mailed on Jul. 22, 2024, 9 pages.
Japan Office Action for Application No. 2024-500590, dated Jan. 30, 2025.
International Search Report and Written Opinion dated Dec. 16, 2022, corresponding to International Application No. PCT/CN2022/123425.
Notice of Grant of Utility Model Patent Rights, dated Feb. 22, 2022, corresponding to CN Application No. 202122749834.0.
Anonymous: “Leadscrew—Wikipedia”; Oct. 24, 2021 (Oct. 24, 2021); pp. 1-7.
Anonymous: “Gear train—Wikipedia”; Oct. 20, 2021 (Oct. 20, 2021); pp. 1-11.
Anonymous: “Linear Actuator Design Training Thomson”; Oct. 16, 2021 (Oct. 16, 2021); pp. 1-3.
Anonymous: “Discover The Inside of Electric Cylinders-”; Oct. 24, 2020 (Oct. 24, 2020); pp. 1-3.
Summons to attend oral proceedings issued by European Patent Office, dated Apr. 20, 2026 for European Appl. No. 22 891 694.6.

* cited by examiner

BATTERY SWAP APPARATUS AND BATTERY SWAP SYSTEM

CROSS-REFERENCE TO RELATED APPLICATION

The present application is a continuation of International application PCT/CN2022/123425 filed on Sep. 30, 2022 that claims priority to Chinese Patent Application No. 202122749834.0 filed on Nov. 10, 2021. The subject matter of these applications is incorporated herein by reference in its entirety.

TECHNICAL FIELD

The present application relates to the technical field of battery swap for electrical devices, and in particular to a battery swap apparatus and a battery swap system.

BACKGROUND ART

With the development of new energy technology, the number of devices using batteries is increasing. When the power of the electrical device is exhausted, it is often supplemented with power by connecting to a charging device. Moreover, there is also a way to quickly supplement power by swapping the battery. In general, there is a need for a special apparatus (i.e., a battery swap apparatus) to swap the battery.

Due to the structural limitation of the existing battery swap apparatus, the battery swap operation is inconvenient, and the swapping efficiency of the battery is low.

SUMMARY OF THE INVENTION

Embodiments of the present application provide a battery swap apparatus and a battery swap system to improve the problem of inconvenient battery swap operation of the battery swap apparatus.

In a first aspect, embodiments of the present application provide a battery swap apparatus, including a floating platform, a locking and unlocking mechanism, and a positioning mechanism. The locking and unlocking mechanism is arranged on the floating platform and configured to lock the battery to the electrical device or to unlock the battery from the electrical device. The positioning mechanism is arranged on the floating platform and configured to position the floating platform relative to the electrical device. The positioning mechanism includes an positioning member and a driving member. The driving member is configured to drive the positioning member to move in a height direction of the battery swap apparatus, so as to adjust the height of the positioning member.

In the above technical solution, the driving member can drive the positioning member to move in the height direction of the battery swap apparatus, so as to adjust the height of the positioning member. When the battery swap apparatus is transporting the battery or the battery swap apparatus is not in operation, the driving member drives the positioning member to move downwardly to reduce the height of the positioning member, thereby reducing the height dimension of the battery swap apparatus and reducing the space occupied by the battery swap apparatus in the height direction. During the process of transporting the battery by the battery swap apparatus, by reducing the height of the battery swap apparatus, the passability of the battery swap apparatus can be improved, and the elevation height of the electrical device can be reduced. During the process of swapping the battery of the electrical device by the battery swap apparatus, the driving member drives the positioning member to move upwardly to increase the height of the positioning member, so that the positioning member is in locational fit with the electrical device to position the floating platform relative to the electrical device in place. In this way, the locational fit between the electrical device and the positioning member can be easily realized. Through the movement, the positioning member is in locational fit with the electrical device, so that the operation is simple and the efficiency is high, and the positioning member is adjusted to different height positions, so that the positioning member can adapt to the electrical devices with different heights.

In some embodiments of the first aspect of the present application, the positioning mechanism includes a transmission assembly, and the driving member is in transmission connection with the positioning member via the transmission assembly; and the transmission assembly is configured to convert a rotation of an output end of the driving member into a linear movement of the positioning member.

In the above technical solution, the transmission assembly can convert the rotation of the output end of the driving member into the linear movement of the positioning member, so that the dimension of the positioning mechanism in the height direction and the space occupied by the positioning mechanism in the height direction can be reduced.

In some embodiments of the first aspect of the present application, the transmission assembly includes a first gear, a second gear and a lead screw, the first gear meshes with the second gear, the first gear is connected to the output end of the driving member, the second gear is sleeved on the lead screw and threadedly connected to the lead screw, and the positioning member is connected to the lead screw; and a rotation axis of the first gear, a rotation axis of the second gear and an axis of the lead screw are all consistent with the height direction of the battery swap apparatus.

In the above technical solution, the first gear meshes with the second gear, the second gear is sleeved on the lead screw and threadedly connected to the lead screw, and the rotation axis of the first gear, the rotation axis of the second gear and the axis of the lead screw are all consistent with the height direction of the battery swap apparatus; therefore, the cooperation between the first gear, the second gear and the lead screw can convert the rotation of the output end of the driving member into the linear movement of the positioning member. Through the transmission connection between the driving member and the positioning member via the transmission assembly, the dimension of the positioning mechanism in the height direction and the space occupied by the positioning mechanism in the height direction can be reduced.

In some embodiments of the first aspect of the present application, the positioning mechanism further includes a first mounting seat, a connecting plate and a first guide shaft. The mounting seat is fixed to the floating platform; the driving member, the first gear and the second gear are all mounted to the mounting seat; and the connecting plate is connected to the lead screw, the positioning member is connected to the connecting plate, and the first guide shaft slidably passes through the first mounting seat and is connected to the connecting plate.

In the above technical solution, the first guide shaft is connected to the connecting plate, and the first guide shaft slidably passes through the first mounting seat, and can provide a guiding function when the positioning member moves in the height direction of the battery swap apparatus, to improve the stability of the movement of the positioning member, thereby improving the accuracy of the locational fit between the positioning member and the electrical device.

In some embodiments of the first aspect of the present application, the positioning mechanism further includes a first detection unit configured to detect height information of the positioning member.

In the above technical solution, the height information of the positioning member is detected by the first detection unit, so that a reference can be provided for determining whether the positioning member is in locational fit with the electrical device, so as to ensure the locational fit between the positioning member and the electrical device. Through the detection of the height information of the positioning member by the first detection unit, insufficient or excessive adjustment of the height of the positioning member can also be avoided.

In some embodiments of the first aspect of the present application, the battery swap apparatus further includes a supporting mechanism. The supporting mechanism includes a second mounting seat, a supporting member and an elastic member. The second mounting seat is fixed to the floating platform, the elastic member is elastically supported between the supporting member and the second mounting seat, and the supporting member is configured to support the battery.

In the above technical solution, the elastic member is elastically supported between the supporting member and the second mounting seat, and the supporting member is configured to support the battery, so that when the electrical device or the battery is inclined to a certain extent, the supporting mechanism can adapt to the inclination of the electrical device or the battery through the compression of the elastic member to keep the battery in close contact with the electrical device, thereby improving the success rate of the mounting or removal of the battery.

In some embodiments of the first aspect of the present application, the supporting mechanism further includes a second guide shaft. The second guide shaft slidably passes through the second mounting seat and is connected to the supporting member.

In the above technical solution, the second guide shaft is connected to the supporting member, and the second guide shaft slidably passes through the second mounting seat, and can provide a guiding function during the compression or stretch of the elastic member, ensuring that the elastic member is compressed or stretched along a fixed path and that the supporting member moves along a fixed path, improving the stability of the movement of the supporting member, thereby improving the support stability of the supporting member to the battery.

In some embodiments of the first aspect of the present application, the supporting mechanism further includes a second detection unit configured to detect whether the supporting member is in contact with the battery.

In the above technical solution, the second detection unit detects whether the supporting member is in contact with the battery, and if the supporting member is not in contact or is not in full contact with the battery, the supporting member may be adjusted to be in contact with the battery, thereby improving the success rate of unlocking of the battery from the electrical device.

In some embodiments of the first aspect of the present application, the battery swap apparatus further includes a movable base, a lifting platform, and an elevation mechanism. The floating platform is floatingly connected to the lifting platform; and the elevation mechanism is arranged between the movable base and the lifting platform, and is configured to elevate the lifting platform.

In the above technical solution, the floating platform is floatingly connected to the lifting platform, so that the floating platform can float relative to the lifting platform, and the locational fit between the positioning member of the positioning mechanism and the electrical device can be easily realized by floating the floating platform relative to the lifting platform. The elevation mechanism can elevate the floating platform and the positioning mechanism arranged on the floating platform to different heights, so as to adapt to different electrical devices.

In some embodiments of the first aspect of the present application, the battery swap apparatus further includes a locking assembly configured to lock the floating platform to the lifting platform or to release the floating platform from the lifting platform.

In the above technical solution, the locking assembly is configured to lock the floating platform to the lifting platform or to release the floating platform from the lifting platform, so that when it is necessary to position the positioning member of the positioning mechanism relative to the electrical device, the locking assembly releases the floating platform from the lifting platform such that the floating platform can float relative to the lifting platform, to position the positioning member relative to the electrical device in place. During the process of locking the battery to the electrical device or unlocking the battery from the electrical device by the locking and unlocking mechanism and during the process of transporting the battery by the battery swap apparatus, the locking assembly locks the floating platform to the lifting platform so that the battery is stably placed on the floating platform, improving the stability of dismounting and mounting of the battery and the stability of the transportation of the battery.

In some embodiments of the first aspect of the present application, the locking assembly includes an electromagnet and a magnet attraction plate. The electromagnet is arranged on one of the lifting platform and the floating platform, and the magnet attraction plate is arranged on the other one of the lifting platform and the floating platform.

In the above technical solution, through the cooperation between the electromagnet and the magnet attraction plate, the locking of the floating platform to the lifting platform or the releasing of the floating platform from the lifting platform has a fast action response, and the floating platform can be locked to the lifting platform or released from the floating platform in a timely manner, improving the swapping efficiency of the battery.

In a second aspect, embodiments of the present application provide a battery swap system, including a track, a battery swap platform, a battery pick-and-place apparatus, and a battery swap apparatus provided in embodiments of the first aspect. The battery swap apparatus is movably arranged on the track; the battery swap platform is located at one end of the track; and the battery pick-and-place apparatus is located at the other end of the track.

In the above technical solution, the driving member of the battery swap apparatus can drive the positioning member to move in the height direction of the battery swap apparatus, so as to adjust the height of the positioning member. When the battery swap apparatus is transporting the battery or the battery swap apparatus is not in operation, the driving member drives the positioning member to move downwardly to reduce the height of the positioning member, thereby reducing the height dimension of the battery swap apparatus and reducing the space occupied by the battery swap apparatus in the height direction. During the process of transporting the battery by the battery swap apparatus, by reducing the height of the battery swap apparatus, the passability of the battery swap apparatus can be improved, and the elevation height of the electrical device can be reduced. During the process of swapping the battery of the electrical device by the battery swap apparatus, the driving member drives the positioning member to move upwardly to increase the height of the positioning member, so that the positioning member is in locational fit with the electrical device. In this way, the locational fit between the electrical device and the positioning member can be easily realized. Moreover, by adjusting the positioning member to different height positions, the positioning member can adapt to the electrical devices with different heights, so that the battery swap system can adapt to the battery swap for different electrical devices.

DESCRIPTION OF DRAWINGS

To more clearly describe the technical solutions of embodiments of the present application, the drawings to be used in the embodiments will be briefly introduced below, and it should be understood that the following drawings only show some embodiments of the present application, and therefore should not be considered as limiting the scope of the present application. For those of ordinary skill in the art, other relevant drawings may also be obtained based on these drawings without involving any inventive effort.

Figure 1:
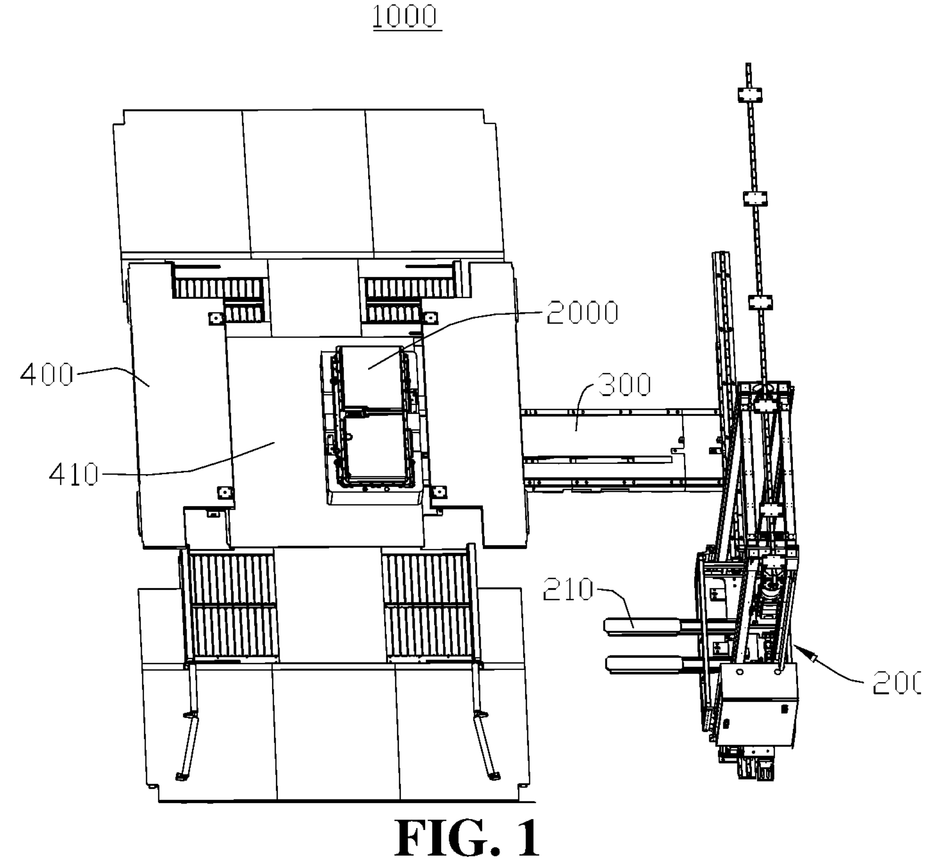
FIG. 1 is a schematic structural diagram of a battery swap system provided in some embodiments of the present application.

List of reference signs: 1000—Battery swap system; 100—Battery swap apparatus; 10—Floating platform; 11—Mounting member; 12—Fixed block; 111—First connecting portion; 112—Second connecting portion; 20—Locking and unlocking mechanism; 21—Locking and unlocking driving motor; 22—Bolt sleeve; 30—Positioning mechanism; 31—Driving member; 32—Positioning member; 33—Transmission assembly; 331—First gear; 332—Second gear; 333—Lead screw; 34—First mounting seat; 341—First guide hole; 35—Connecting plate; 36—First guide shaft; 37—First detection unit; 40—Supporting mechanism; 41—Second mounting seat; 411—Second guide hole; 42—Supporting member; 43—Elastic member; 44—Second guide shaft; 45—Second detection unit; 50—Movable base; 51—Bottom plate; 511—First sliding rail; 52—Driving motor; 53—Gear; 54—Roller; 60—Lifting platform; 61—Floating chain; 62—Second sliding rail; 70—Elevation mechanism; 71—Scissor unit; 711—First scissor arm; 7111—First slider; 712—Second scissor arm; 7121—Second slider; 72—Driving component; 73—First transmission member; 74—Second transmission member; 741—Bevel; 75—Lead screw; 76—Nut; 77—Mounting shaft; 80—Locking assembly; 81—Electromagnet; 82—Magnet attraction plate; 90—Protective enclosure; 91—First opening; 92—Second opening; 93—Third opening; 94—Slot; 95—Notch; 200—Battery pick-and-place apparatus; 210—Fork; 300—Track; 400—Battery swap platform; 410—Avoidance opening; 2000—Battery; 3000—Vehicle.

DETAILED DESCRIPTION

In order to make the objectives, technical solutions and advantages of embodiments of the present application clearer, the technical solutions in embodiments of the present application will be clearly and completely described below with reference to the drawings for embodiments of the present application. Apparently, the described embodiments are some of, rather than all of, the embodiments of the present application. The assembly of the embodiments of the present application generally described and illustrated in the drawings herein can be arranged and designed in a variety of different configurations.

Therefore, the following detailed description of embodiments of the present application, which are set forth in the drawings, is not intended to limit the scope of protection of the present application, but is merely representative of selected embodiments of the present application. On the basis of the embodiments of the present application, all other embodiments obtained by those of ordinary skill in the art without involving any inventive effort shall fall within the scope of protection of the present application.

It should be noted that the embodiments in the present application and the features of the embodiments can be combined with each other without conflict.

It should be noted that like numerals and letters refer to like items in the following figures, so once an item is defined in one figure, it does not require further definition and explanation in subsequent figures.

In the description of embodiments of the present application, it should be noted that the indicated orientation or positional relationships are based on the orientation or positional relationships shown in the accompanying drawings, or are orientation or positional relationships in which a product of the present application is conventionally placed when in use, or are orientation or positional relationships commonly understood by those skilled in the art, and are intended to facilitate the description of the present application and simplify the description only, rather than indicating or implying that the apparatus or element referred to must have a particular orientation or be constructed and operated in a particular orientation, and therefore cannot be construed as limiting the present application. In addition, the terms "first", "second", "third", etc. are for discriminative description purposes only and should not be construed as indicating or implying relative importance.

With the development of new energy technology, the number of devices using batteries is increasing. When the power of the electrical device is exhausted, it is often supplemented with power by connecting to a charging device. For example, an electric vehicle may be charged by connecting to a charging pile. Compared with the method of connecting to a charging device such as a charging pile to supplement power, the swapping of a battery enables a faster power supplementation. At present, there is also a battery swap system specially used for battery swap. The battery swap system is provided with a battery pick-and-place apparatus and a movable battery swap apparatus. The battery swap apparatus is configured to swap the battery of the electrical device.

The existing battery swap apparatus includes a floating platform, a locking and unlocking mechanism, and a positioning mechanism. The locking and unlocking mechanism is arranged on the floating platform, and the locking and unlocking mechanism is configured to lock the battery to the electrical device or to unlock the battery from the electrical device. A positioning member is arranged on the floating platform, and the positioning member is used to position the floating platform relative to the electrical device in place by means of locational fit with the electrical device.

The inventors have found that the positioning member is fixed to a positioning platform. The positioning member defines the highest position of the battery swap apparatus in a height direction, resulting in a large height dimension of the battery swap apparatus and occupying a large space in the height direction. Moreover, since a positioning pin is fixed to the positioning platform, it is necessary for the electrical device to adapt to the height of the positioning pin. Generally, the electrical device has a large volume, so it is inconvenient to operate the electrical device to adapt to the height of the positioning pin, and the battery swap efficiency is low.

In order to solve the problem of a large space occupied by the battery swap apparatus in the height direction and low battery swap efficiency due to the need for the electrical device to adapt to the height of the positioning member, the present application provides a technical solution, in which the positioning member is driven by a driving member to move in the height direction of the battery swap apparatus, so as to adjust the height of the positioning member. When the battery swap apparatus is transporting the battery or the battery swap apparatus is not in operation, the driving member drives the positioning member to move downwardly to reduce the height of the positioning member, thereby reducing the height dimension of the battery swap apparatus and reducing the space occupied by the battery swap apparatus in the height direction. During the process of transporting the battery by the battery swap apparatus, by reducing the height of the battery swap apparatus, the passability of the battery swap apparatus can be improved, and the elevation height of the electrical device can be reduced. During the process of swapping the battery of the electrical device by the battery swap apparatus, the driving member drives the positioning member to move upwardly to increase the height of the positioning member, so that the positioning member is in locational fit with the electrical device. In this way, the locational fit between the electrical device and the positioning member can be easily realized. Through the movement, the positioning member is in locational fit with the electrical device, so that the operation is simple and the efficiency is high, and the positioning member is adjusted to different height positions, so that the positioning member can adapt to the electrical devices with different heights.

The battery swap apparatus and the battery swap system disclosed in embodiments of the present application may be used, but not limited to, to swap a battery of a vehicle, and may also be used to swap a battery of another electrical device such as a boat, an aircraft, an electric toy, an electric tool, an electric motorcycle, an electric vehicle, a ship, and a spacecraft. The electric toy may include a fixed or mobile electric toy, such as a game console, an electric car toy, an electric ship toy, and an electric airplane toy. The electric tool may include a fixed or mobile electric tool, such as an electric machine tool and an electric sweeper. The spacecraft may include an airplane, a rocket, a space shuttle and a spaceship.

Hereinafter, a battery swap apparatus and a battery swap system will be described by taking the example that the electrical device is a vehicle.

Figure 2:
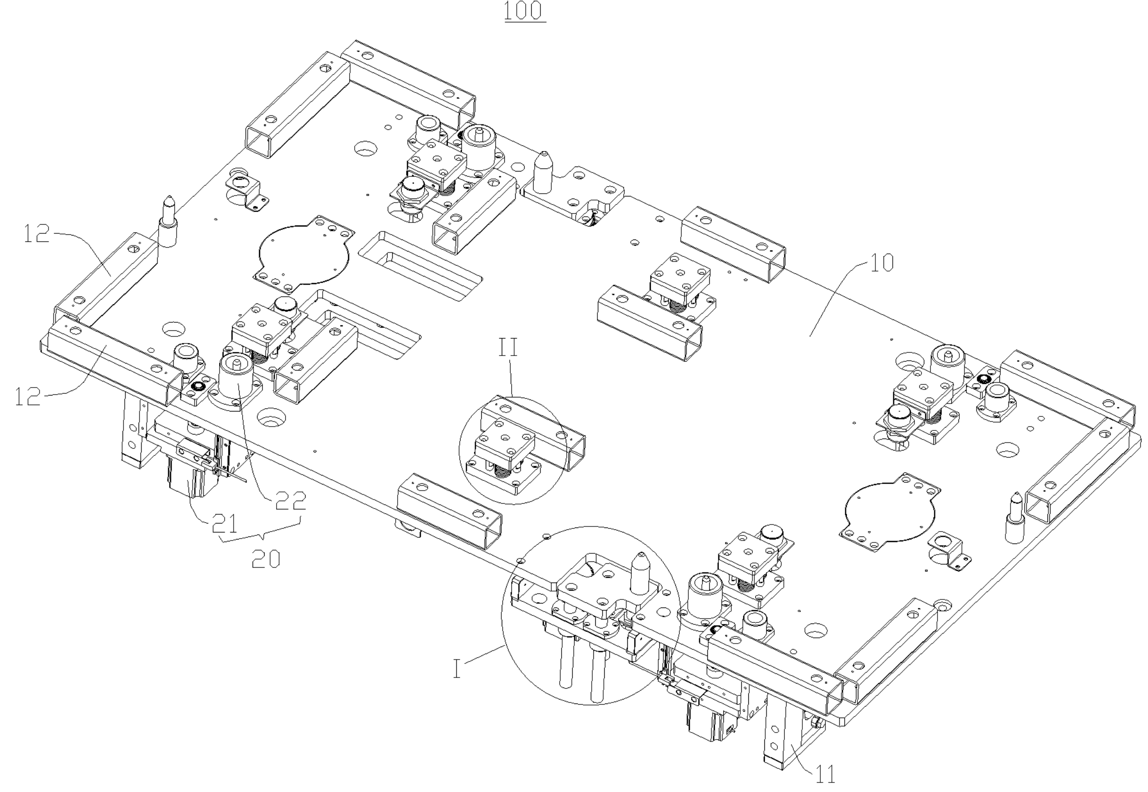
FIG. 2 is a schematic structural diagram of a battery swap apparatus provided in some embodiments of the present application.

Referring to FIGS. 1 and 2, the battery swap system 1000 includes a battery swap apparatus 100 and a battery pick-and-place apparatus 200.

The battery swap system 1000 further includes a battery charging apparatus (not shown), which is configured to store a battery 2000 and to charge the battery 2000. The battery pick-and-place apparatus 200 may be a stacker, and the battery pick-and-place apparatus 200 is provided with forks 210 (the forks 210 may also be replaced by mechanical arms). The forks 210 take the battery 2000 to be charged away from the battery swap apparatus 100 and put the battery into the battery charging apparatus for recycling, and take out a fully charged battery 2000 from the battery charging apparatus and put the battery on the battery swap apparatus 100.

In order to realize the swapping of the battery 2000 of the vehicle, it is necessary to remove the exhausted battery 2000 from the vehicle and transport the battery to a battery charging and discharging apparatus for charging by means of the battery swap apparatus 100, and then transport a fully charged battery 2000 to the vehicle and mount the battery 2000 to the vehicle by means of the battery swap apparatus 100. In some embodiments, the battery swap system 1000 further includes a track 300, and the battery swap apparatus 100 is movably arranged on the track 300.

The battery swap apparatus 100 reciprocates on the track 300, so that the battery swap apparatus 100 moves between the vehicle and the battery pick-and-place apparatus 200. The battery swap apparatus 100 dismounts the battery 2000 to be charged from the vehicle and transports the battery along the track 300 to the battery pick-and-place apparatus 200, and then mounts a fully charged battery 2000 refreshed by the battery pick-and-place apparatus 200 to the vehicle.

The battery swap system 1000 further includes a battery swap platform 400. The battery swap platform 400 is located at one end of the track 300; and the battery pick-and-place apparatus 200 is located at the other end of the track 300. The battery swap platform 400 is configured to park the vehicle, and the battery 2000 of the vehicle is swapped on the battery swap platform 400. The battery swap platform 400 is configured to lift the vehicle as a whole. The vehicle is located on the battery swap platform 400. The battery swap platform 400 is provided with an avoidance opening 410. A mounting position (not shown) of the battery 2000 of the vehicle corresponds to the avoidance opening 410. The battery swap apparatus 100 is parked under the avoidance opening 410, and a battery swap mechanism on the battery swap apparatus 100 passes through the avoidance opening 410 to dismount or mount the battery 2000. The battery swap apparatus 100 moves between the battery swap platform 400 and the battery pick-and-place apparatus 200.

It should be noted that the mounting position of the battery 2000 refers to a space formed in the electrical device for receiving the battery 2000. For example, an upwardly recessed groove is formed in a chassis of the vehicle such that when the battery 2000 is located in the groove, a surface of the battery 2000 is approximately flush with other portions of the chassis.

Referring to FIG. 2, in some embodiments, the battery swap apparatus 100 includes a floating platform 10, a locking and unlocking mechanism 20, and a positioning mechanism 30. The locking and unlocking mechanism 20 is arranged on the floating platform 10, and the locking and unlocking mechanism 20 is configured to lock the battery 2000 to the electrical device or to unlock the battery 2000 from the electrical device. The positioning mechanism 30 is arranged on the floating platform 10, and the positioning mechanism 30 is configured to position the floating platform 10 relative to the electrical device. The positioning mechanism 30 includes a positioning member 32 and a driving member 31. The driving member 31 is configured to drive the positioning member 32 to move in a height direction of the battery swap apparatus 100, so as to adjust the height of the positioning member 32.

Depending on the connection relationship between the battery 2000 and the electrical device, the locking and unlocking mechanism 20 is correspondingly configured in different forms. For example, in some embodiments, the battery 2000 is provided with a fastening bolt, and the chassis of the vehicle is provided with a movable nut. The fastening bolt is in a threaded fit with the movable nut. The locking and unlocking mechanism 20 is configured to screw the fastening bolt into the movable nut to fixedly mount the battery 2000 to the mounting position of the battery 2000, and the locking and unlocking mechanism is configured to unscrew the fastening bolt out of the movable nut to unlock the battery 2000 from the vehicle. For example, the locking and unlocking mechanism 20 includes a locking and unlocking driving motor 21 and a bolt sleeve 22. One end of the bolt sleeve 22 is connected to an output end of the locking and unlocking driving motor 21, and the other end of the bolt sleeve 22 cooperates with the fastening bolt. The locking and unlocking driving motor 21 drives the bolt sleeve 22 to rotate forwardly or reversely, so as to drive the fastening bolt to screw into or unscrew from the movable nut. In other embodiments, the locking and unlocking mechanism 20 may also adopt other ways of locking and unlocking the battery 2000.

Since the floating platform 10 can float relative to the electrical device, the floating platform 10 is fixed to the electrical device by means of the positioning mechanism 30, so that it is convenient for the locking and unlocking mechanism 20 to lock the battery 2000 to the electrical device or to unlock the battery 2000 from the electrical device, thereby improving the success rate of dismounting and mounting of the battery 2000.

The height direction of the battery swap apparatus 100 is perpendicular to the plane where the floating platform 10 is located.

The driving member 31 may be an electric motor, an air cylinder, a hydraulic cylinder, etc. The driving member 31 may directly drive the positioning member 32 to move in the height direction of the battery swap apparatus 100, or indirectly drive the positioning member 32 to move in the height direction of the battery swap apparatus 100.

There may be one or a plurality of positioning mechanisms 30, which is rationally set depending on the practical application in which there is a need for the positioning mechanisms 30. In an embodiment in which there are a plurality of positioning mechanisms 30, the plurality of positioning mechanisms 30 may jointly position the floating platform 10 relative to the electrical device, or some of the positioning mechanisms 30 may position the floating platform 10 relative to the electrical device. By "a plurality of" is meant two or more.

The driving member 31 can drive the positioning member 32 to move in the height direction of the battery swap apparatus 100, so as to adjust the height of the positioning member 32. When the battery swap apparatus 100 is transporting the battery 2000 or the battery swap apparatus 100 is not in operation, the driving member 31 drives the positioning member 32 to move downwardly to reduce the height of the positioning member 32, thereby reducing the height dimension of the battery swap apparatus 100 and reducing the space occupied by the battery swap apparatus 100 in the height direction. During the process of transporting the battery 2000 by the battery swap apparatus 100, by reducing the height of the battery swap apparatus 100, the passability of the battery swap apparatus 100 can be improved, and the elevation height of the electrical device can be reduced. During the process of swapping the battery 2000 of the electrical device by the battery swap apparatus 100, the driving member 31 drives the positioning member 32 to move upwardly to increase the height of the positioning member 32, so that the positioning member 32 is in locational fit with the electrical device to position the floating platform 10 relative to the electrical device in place. In this way, the locational fit between the electrical device and the positioning member 32 can be easily realized. Through the movement, the positioning member 32 is in locational fit with the electrical device, so that the operation is simple and the efficiency is high, and the positioning member 32 is adjusted to different height positions, so that the positioning member 32 can adapt to the electrical devices with different heights.

Figure 3:
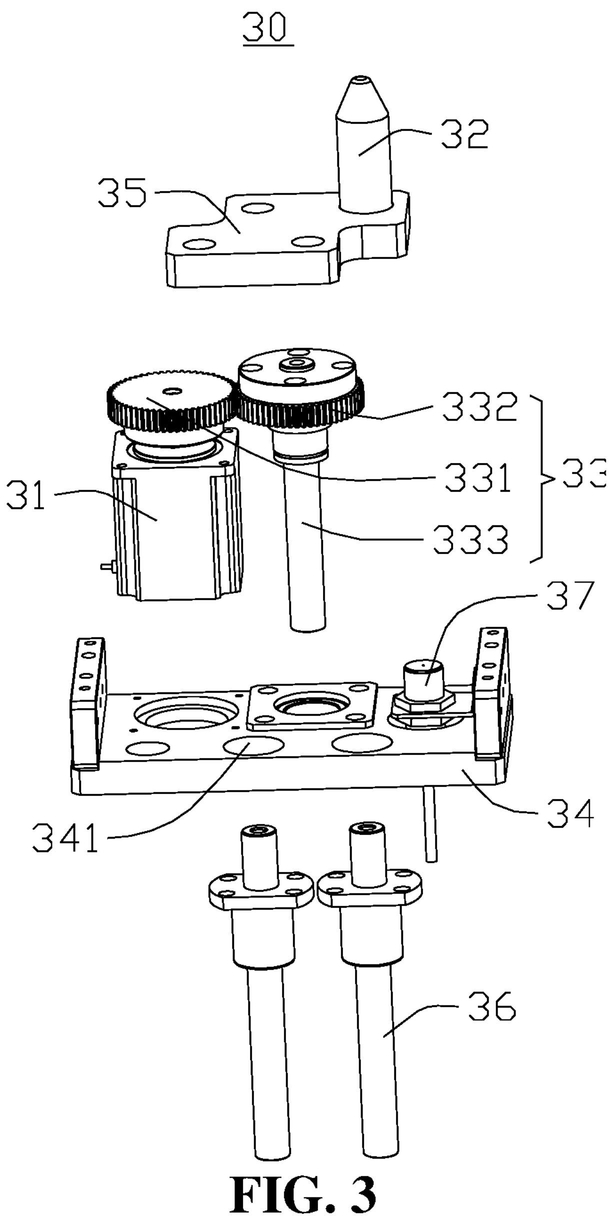
FIG. 3 is an exploded view of a positioning mechanism provided in some embodiments of the present application.
Figure 4:
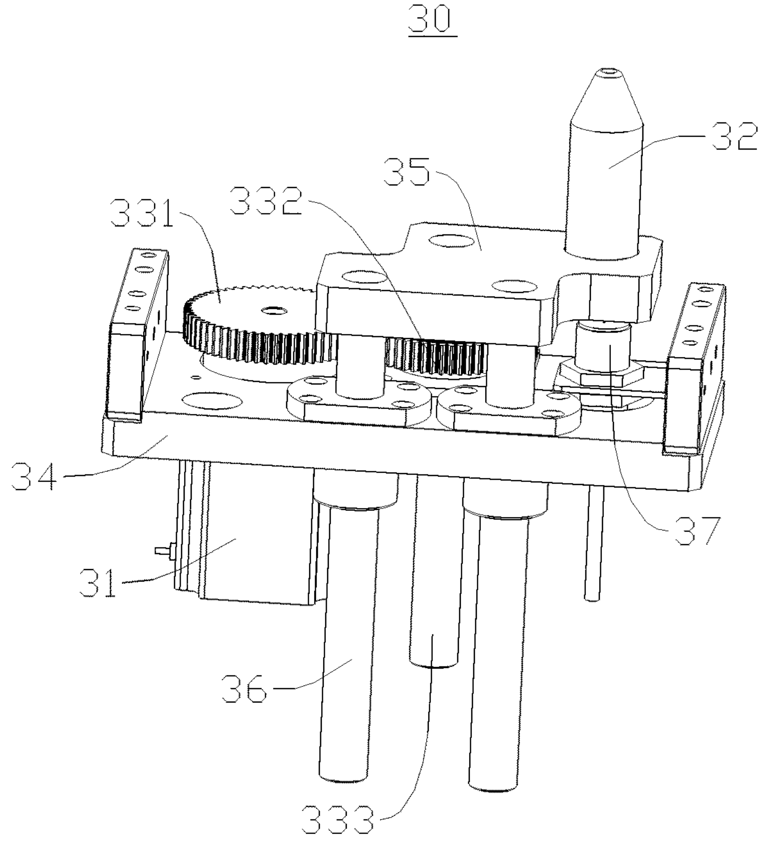
FIG. 4 is a schematic structural diagram of a positioning mechanism provided in some embodiments of the present application.

Referring to FIGS. 3 and 4, in some embodiments, the positioning mechanism 30 includes a transmission assembly 33, and the driving member 31 is in transmission connection with the positioning member 32 via the transmission assembly 33; and the transmission assembly 33 is configured to convert a rotation of an output end of the driving member 31 into a linear movement of the positioning member 32.

The driving member 31 may be directly connected to the positioning member 32 so as to directly drive the positioning member 32 to move, or may be indirectly connected to the positioning member. By the driving member 31 being in transmission connection with the positioning member 32 via the transmission assembly 33, it is meant that the driving member 31 drives, indirectly via the transmission assembly

33, the positioning member 32 to move in the height direction of the battery swap apparatus 100.

The transmission assembly 33 can convert the rotation of the output end of the driving member 31 into the linear movement of the positioning member 32, so that the dimension of the positioning mechanism 30 in the height direction and the space occupied by the positioning mechanism 30 in the height direction can be reduced.

To convert the rotation of the output end of the driving member 31 into the linear movement of the positioning member 32, there are many structural forms of the transmission assembly 33. For example, as shown in FIGS. 3 and 4, in some embodiments, the transmission assembly 33 includes a first gear 331, a second gear 332 and a lead screw 333. The first gear 331 meshes with the second gear 332, the first gear 331 is connected to the output end of the driving member 31, the second gear 332 is sleeved on the lead screw 333 and threadedly connected to the lead screw 333, and the positioning member 32 is connected to the lead screw 333. A rotation axis of the first gear 331, a rotation of the second gear 332 and an axis of the lead screw 333 are all consistent with the height direction of the battery swap apparatus 100.

The driving member 31 is an electric motor, the rotation of the output shaft of the driving member 31 drives the first gear 331 to rotate, the second gear is rotationally connected to the floating platform 10, the rotation of the first gear 331 drives the second gear 332 to rotate, and the second gear 332 is provided with a threaded hole to which the lead screw 333 is threadedly connected. The first gear 331 drives the second gear 332 to rotate about the axis of the lead screw 333, the second gear 332 is threadedly connected to the lead screw 333, and the rotation of the second gear 332 drives the lead screw 333 to move in the height direction of the battery swap apparatus 100, thereby driving the positioning member 32 to move in the height direction of the battery swap apparatus 100.

In other embodiments, the transmission assembly 33 may also have another structural form such as a belt transmission assembly 33 and a chain transmission assembly 33. For example, the transmission assembly 33 is a belt transmission assembly 33, and the transmission assembly 33 includes a driving pulley, a driven pulley, a transmission belt and a lead screw 333. The driving pulley is connected to the output end of the driving member 31, the driven pulley is sleeved on the lead screw 333 and is threadedly connected to the lead screw 333, the rotation of the output shaft of the driving member 31 drives the driving pulley to rotate, and the driving pulley drives the driven pulley to rotate by means of the transmission belt, the rotation of the driven pulley drives the lead screw 333 to move linearly in the height direction of the battery swap apparatus 100, thereby driving the positioning member 32 to move in the height direction of the battery swap apparatus 100.

The first gear 331 meshes with the second gear 332, the second gear 332 is sleeved on the lead screw 333 and threadedly connected to the lead screw 333, and the rotation axis of the first gear 331, the rotation axis of the second gear 332 and the axis of the lead screw 333 are all consistent with the height direction of the battery swap apparatus 100; therefore, the cooperation between the first gear 331, the second gear 332 and the lead screw 333 can convert the rotation of the output end of the driving member 31 into the linear movement of the positioning member 32. Through the transmission connection between the driving member 31 and the positioning member 32 via the transmission assembly 33, the dimension of the positioning mechanism 30 in the height direction and the space occupied by the positioning mechanism 30 in the height direction can be reduced.

Figure 5:
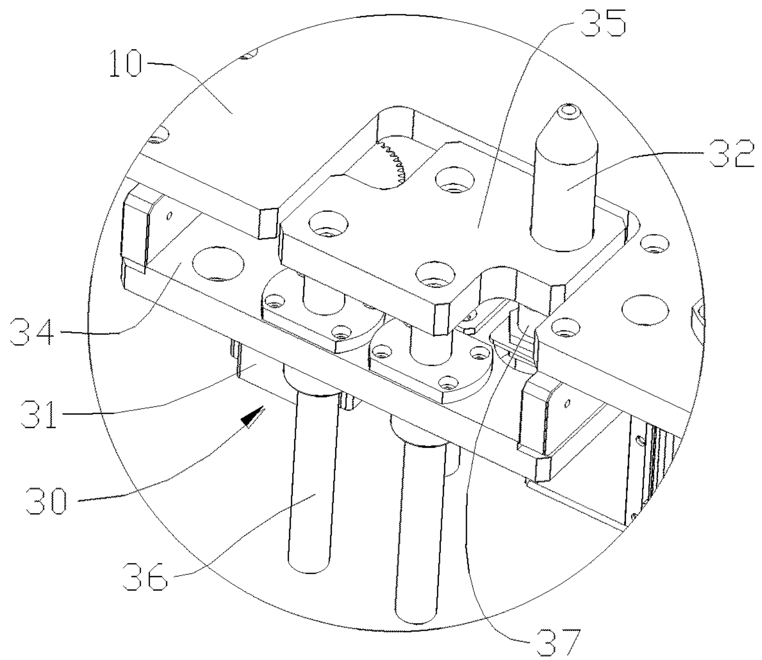
FIG. 5 is an enlarged view of part I in FIG. 2.

Referring to FIGS. 4 and 5, in some embodiments, the positioning mechanism 30 further includes a first mounting seat 34, a connecting plate 35 and a first guide shaft 36. The mounting seat is fixed to the floating platform 10; the driving member 31, the first gear 331 and the second gear 332 are all mounted to the mounting seat; and the connecting plate 35 is connected to the lead screw 333, the positioning member 32 is connected to the connecting plate 35, and the first guide shaft 36 slidably passes through the first mounting seat 34 and is connected to the connecting plate 35.

By the driving member 31, the first gear 331 and the second gear 332 being all mounted to the mounting seat, it is meant that the driving member 31, the first gear 331 and the second gear 332 are all indirectly mounted to the floating platform 10 via the mounting seat. In other embodiments, the driving member 31, the first gear 331 and the second gear 332 may also be directly fixed to the floating platform 10.

The first mounting seat 34 is provided with a first guide hole 341, and the first guide shaft 36 is inserted into the first guide hole 341. There are a plurality of first guide shafts 36 and a plurality of first guide holes 341, the first guide shafts 36 and the first guide holes 341 are arranged in one-to-one correspondence, and each first guide hole 341 is inserted into the corresponding first guide hole 341. When the driving member 31 drives the positioning member 32 to move in the height direction of the battery swap apparatus 100, each first guide shaft 36 axially slides in the corresponding first guide hole 341. In other embodiments, it is also possible that the first guide hole 341 is provided in the connecting plate 35, and the first guide member may be provided on the mounting seat. In an embodiment in which the driving member 31, the first gear 331 and the second gear 332 are all directly fixed to the floating platform 10, the first guide hole 341 may be provided in the floating platform 10.

The first guide shaft 36 is connected to the connecting plate 35, and the first guide shaft 36 slidably passes through the first mounting seat 34, and can provide a guiding function when the positioning member 32 moves in the height direction of the battery swap apparatus 100, to improve the stability of the movement of the positioning member 32, thereby improving the accuracy of the locational fit between the positioning member 32 and the electrical device.

In some embodiments, the positioning mechanism 30 further includes a first detection unit 37 (shown in FIG. 4) configured to detect height information of the positioning member 32.

The first detection unit 37 is mounted to the first mounting seat 34 and located below the connecting plate 35, and the first detection unit 37 may indirectly detect the height of the positioning member 32 by detecting the height of the connecting plate 35. The first detection unit 37 may be a distance sensor, a proximity switch, a trigger switch, etc.

The height information of the positioning member 32 is detected by the first detection unit 37, so that a reference can be provided for determining whether the positioning member 32 is in locational fit with the electrical device, so as to ensure the locational fit between the positioning member 32 and the electrical device. Through the detection of the height information of the positioning member 32 by the first detection unit 37, insufficient or excessive adjustment of the height of the positioning member 32 can also be avoided.

Figure 6:
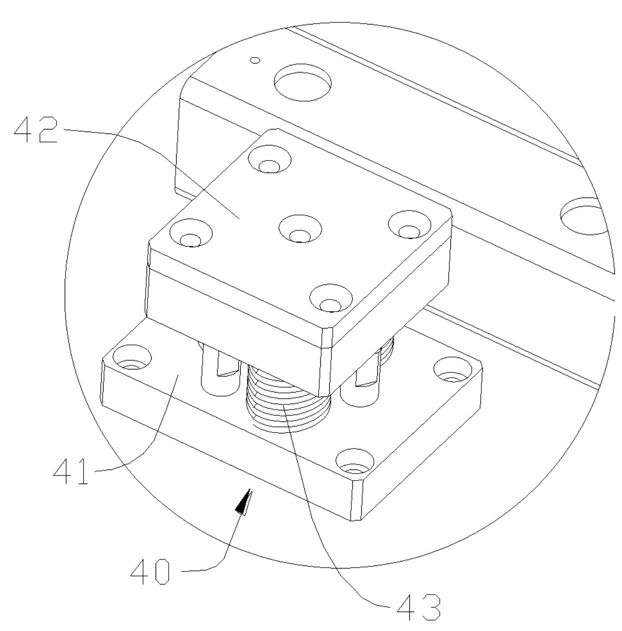
FIG. 6 is an enlarged view of part II in FIG. 2.
Figure 7:
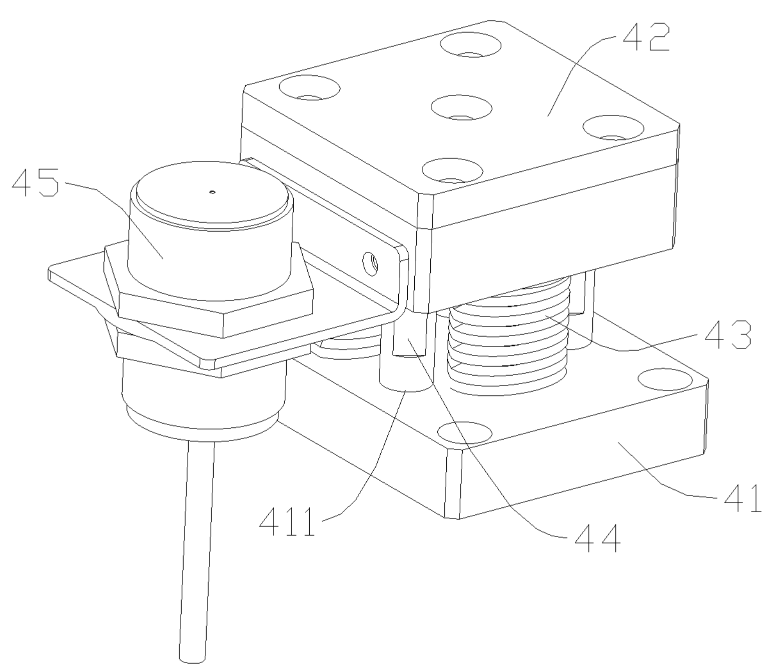
FIG. 7 is a schematic structural diagram of a supporting mechanism provided in some embodiments of the present application.

Referring to FIGS. 6 and 7, in some embodiments, the battery swap apparatus 100 further includes a supporting mechanism 40. The supporting mechanism 40 includes a second mounting seat 41, a supporting member 42 and an elastic member 43. The second mounting seat 41 is fixed to the floating platform 10, the elastic member 43 is elastically supported between the supporting member 42 and the second mounting seat 41, and the supporting member 42 is configured to support the battery 2000.

By the elastic member 43 being elastically supported between the supporting member 42 and the second mounting seat 41, it can be understood that the elastic member 43 is indirectly connected to the floating platform 10 via the second mounting seat 41. In other embodiments, it is also possible that the elastic member 43 is directly connected to the floating platform 10. That is, the elastic member 43 is supported between the supporting member 42 and the floating platform 10.

The elastic member 43 may be a rubber pad, a spring, etc. The elastic member 43 shown in FIGS. 6 and 7 is a spring. One axial end of the spring is connected to the supporting member 42, and the other end is connected to the second mounting seat 41. Each supporting mechanism 40 may include one or more elastic members 43.

There may be one or a plurality of supporting mechanisms 40, which is rationally set depending on the supporting mechanisms 40 required by the practical application. In an embodiment in which there are plurality of supporting mechanisms 40, the plurality of supporting mechanisms 40 may jointly support the battery 2000, or some supporting mechanisms 40 of the plurality of supporting mechanisms 40 may support the battery 2000.

The elastic member 43 is elastically supported between the supporting member 42 and the second mounting seat 41, and the supporting member 42 is configured to support the battery 2000, so that when the electrical device or the battery 2000 is inclined to a certain extent, the supporting mechanism 40 can adapt to the inclination of the electrical device or the battery 2000 through the compression of the elastic member 43 to keep the battery 2000 in close contact with the electrical device, thereby improving the success rate of the mounting or removal of the battery 2000.

Referring to FIG. 7, in some embodiments, the supporting mechanism 40 further includes a second guide shaft 44. The second guide shaft 44 slidably passes through the second mounting seat 41 and is connected to the supporting member 42.

The second mounting seat 41 is provided with a second guide hole 411, and the second guide shaft 44 is inserted into the second guide hole 411. There may be a plurality of second guide shafts 44 and a plurality of second guide holes 411, the second guide shafts 44 and the second guide holes 411 are arranged in one-to-one correspondence, and each second guide hole 411 is inserted into the corresponding second guide hole 411. When the elastic member 43 is compressed or stretched, each second guide shaft 44 axially slides in the corresponding second guide hole 411. In an embodiment in which the elastic member 43 is directly connected to the floating platform 10, it is also possible that the second guide hole 411 is provided in the floating platform 10.

The second guide shaft 44 is connected to the supporting member 42, and the second guide shaft 44 slidably passes through the second mounting seat 41, and can provide a guiding function during the compression or stretch of the elastic member 43, ensuring that the elastic member 43 is compressed or stretched along a fixed path and that the supporting member 42 moves along a fixed path, improving the stability of the movement of the supporting member 42, thereby improving the support stability of the supporting member 42 to the battery 2000.

Still referring to FIG. 7, in some embodiments, the supporting mechanism 40 further includes a second detection unit 45. The second detection unit 45 is configured to detect whether the supporting member 42 is in contact with the battery 2000.

The second detection member is mounted to the supporting member 42, and the surface of the supporting member 42 that is configured to be in contact with the battery 2000 has a higher level than the end surface of the second detection member close to the battery 2000, and the height difference between the end face of the second detection member close to the battery 2000 and the surface of the supporting member 42 that is configured to be in contact with the battery 2000 is constant. The first detection unit 37 may be a distance sensor, a proximity switch, a trigger switch, etc.

In an embodiment in which there are a plurality of supporting mechanisms 40, there are also a plurality of second detection units 45. For example, three or more second detection units 45 are generally arranged on the floating platform 10, and can detect whether there is a battery 2000 on the supporting member 42. When the locking and unlocking mechanism 20 mounts or dismounts the battery 2000 and descends, if signals from the plurality of second detection units 45 are not consistent, it means that the battery 2000 is not completely locked or unlocked, and the battery 2000 is inclined, then the floating platform 10 of the battery swap apparatus 100 stops descending, and performs locking or unlocking again, or a fault alarm is issued. This second detection unit 45 can prevent the battery 2000 from falling when the floating platform 10 of the battery swap apparatus 100 descends with only one side of the battery being locked or unlocked.

The second detection unit 45 detects whether the supporting member 42 is in contact with the battery 2000, and if the supporting member 42 is not in contact or is not in full contact with the battery 2000, the supporting member 42 may be adjusted to be in contact with the battery 2000, thereby improving the success rate of unlocking of the battery 2000 from the electrical device.

Figure 8:
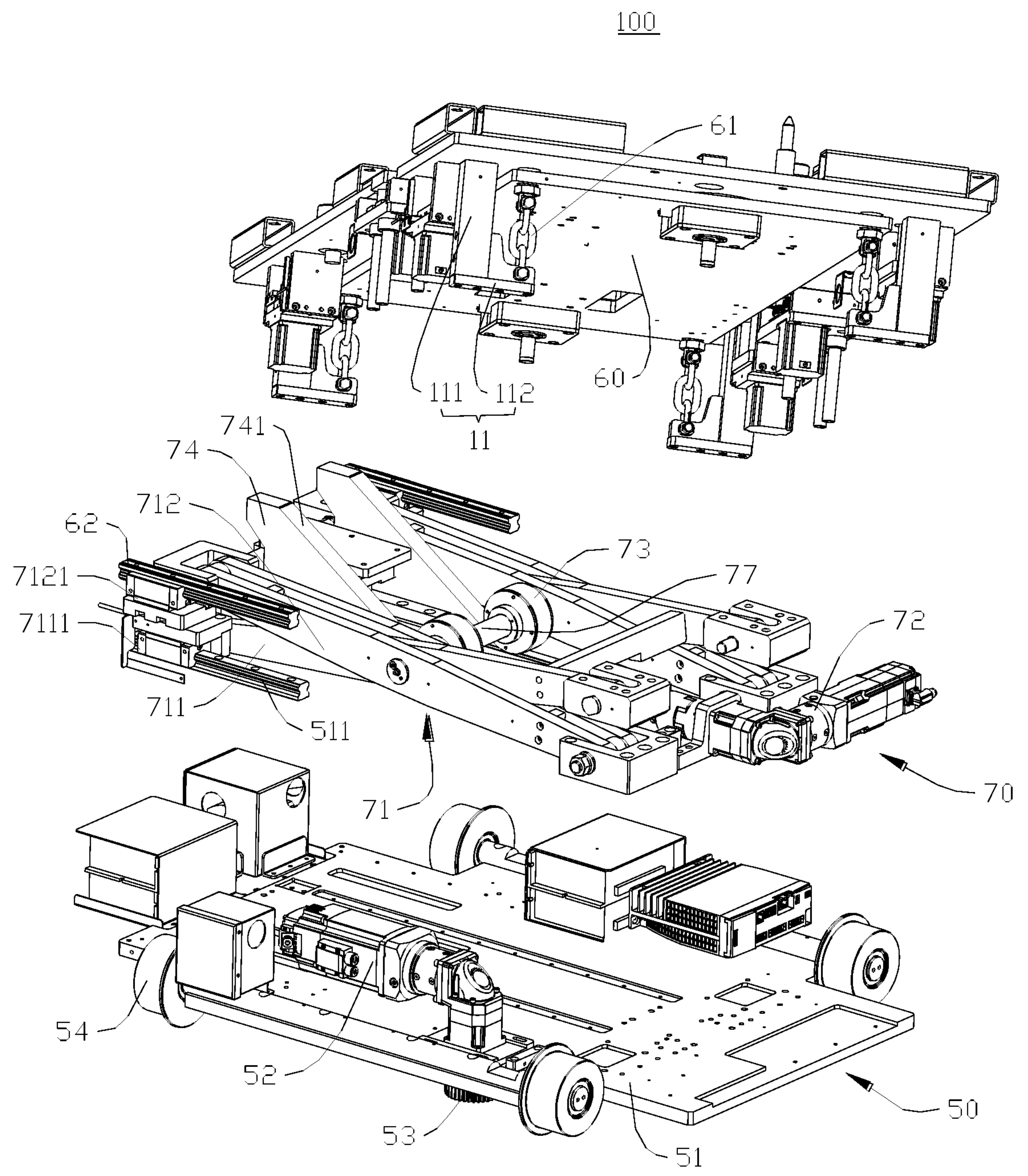
FIG. 8 is a schematic structural diagram of a battery swap apparatus provided in some other embodiments of the present application.

Referring to FIG. 8, in some embodiments, the battery swap apparatus 100 further includes a movable base 50, a lifting platform 60 and an elevation mechanism 70. The floating platform 10 is floatingly connected to the lifting platform 60; and the elevation mechanism 70 is arranged between the movable base 50 and the lifting platform 60, and the elevation mechanism 70 is configured to elevate the lifting platform 60.

The movable base 50 includes a bottom plate 51, a driving motor 52 and a gear 53. The driving motor 52 is mounted to the bottom plate 51, and the gear 53 is mounted to the output end of the driving motor 52, and the gear 53 meshes with a rack (not shown). The rack may be fixed to the ground, or the rack may be fixed to the track 300. The driving motor 52 drives the gear 53 to rotate. Since the gear 53 meshes with the rack, the movable base 50 can be driven to move in an extension direction of the rack during the rotation of the gear 53, such that the battery swap apparatus 100 can move in the extension direction of the rack. The extension direction of the rack is the same as that of the track 300.

In some embodiments, the movable base 50 further includes rollers 54. The rollers 54 cooperate with the track 300. The driving motor 52 drives the gear 53 to rotate, and the rollers 54 roll along the track 300, such that the battery swap apparatus 100 moves along the track 300. The driving motor 52 may also be replaced with a driving motor, a hydraulic driving rod, etc.

The floating platform 10 is floatingly connected to the lifting platform 60, such that the floating platform 10 can move relative to the lifting platform 60 in a horizontal plane, to position the positioning member 32 relative to the electrical device in place.

There are many ways to realize the floating connection between the floating platform 10 and the lifting platform 60. For example, as shown in FIG. 8, a plurality of mounting members 11 are arranged at intervals under the floating platform 10. Each mounting member 11 includes a first connecting portion 111 and a second connecting portion 112. One end of the first connecting portion 111 is connected to the floating platform 10, and the other end of the first connecting portion 111 extends to the bottom of the lifting platform 60 and is connected to the second connecting portion 112. The second connecting portion 112 and the first connecting portion 111 form an L-Shaped mounting member 11. A plurality of floating chains 61 is connected to the lifting platform 60, the number of floating chains 61 is the same as that of mounting members 11, and the floating chains 61 and the mounting members 11 are arranged in one-to-one correspondence. One end of each floating chain 61 is connected to the lifting platform 60, and the other end of the floating chain 61 is connected to the second connecting portion 112 of the corresponding mounting member 11. In the absence of other external forces, the floating chain 61 has a length such that the floating platform 10 is separated from the lifting platform 60 without contact, facilitating the horizontal floating of the floating platform 10 relative to the lifting platform 60, and avoiding the frictional contact between the floating platform 10 and the lifting platform 60 when the floating platform 10 floats horizontally relative to the lifting platform 60, which obstructs the floating.

Figure 9:
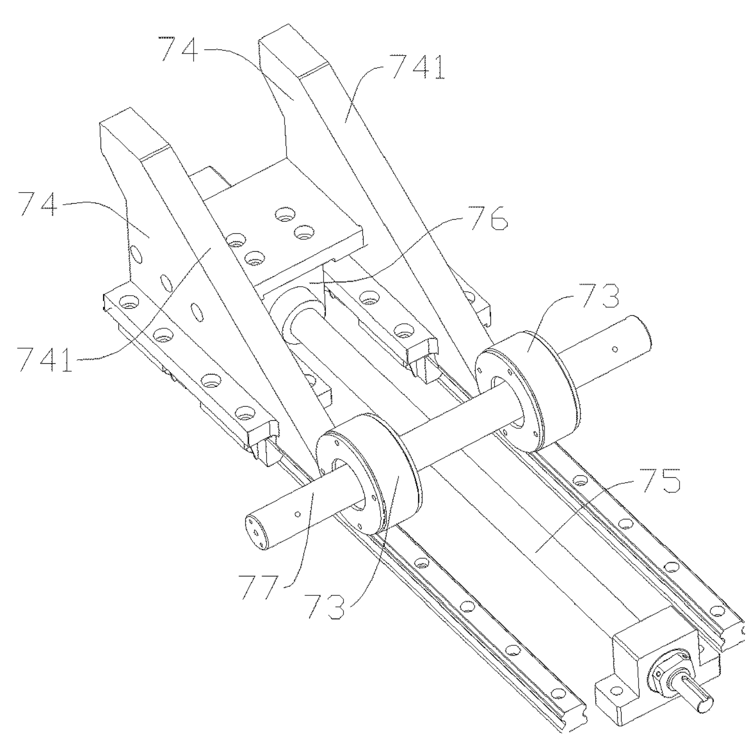
FIG. 9 is a schematic structural diagram of part of an elevation mechanism in FIG. 8.

The elevation mechanism 70 may also have various forms. For example, the elevation mechanism 70 is a power component such as a lifting air cylinder and a hydraulic cylinder, to drive the lifting platform 60 to move up and down in the height direction of the battery swap apparatus 100. For another example, as shown in FIGS. 8 and 9, the elevation mechanism 70 is a scissor lift mechanism, and the battery swap apparatus 100 further includes a movable base 50. The elevation mechanism 70 is arranged between the movable base 50 and the lifting platform 60.

The scissor lift mechanism includes two scissor units 71, a driving component 72, two first transmission members 73, two second transmission members 74, a lead screw 75 and a nut 76. The two scissor units 71 are arranged opposite each other, and each scissor unit 71 includes a first scissor arm 711 and a second scissor arm 712 that are hinged to each other. One end of the first scissor arm 711 is hinged to the lifting platform 60, and the other end of the first scissor arm 711 is movably arranged on the movable base 50. One end of the second scissor arm 712 is hinged to the movable base 50, and the other end of the second scissor arm 712 is movably arranged on the lifting platform 60. The bottom plate 51 of the movable base 50 is provided with a first sliding rail 511, and a first slider 7111 is hinged to one end of the first scissor arm 711. The first slider 7111 slidably cooperates with the first sliding rail 511. The lifting platform 60 is provided with a second sliding rail 62, and a second slider 7121 is hinged to one end of the second scissor arm 712. The second slider 7121 slidably cooperates with the second sliding rail 62. The second transmission member 74 cooperates with a bevel 741 of the first transmission member 73 mounted to a mounting shaft 77. When the second transmission member 74 moves, the first transmission member 73 drives the mounting shaft 77 to ascend and descend, the first slider 7111 moves along the first sliding rail 511, the second slider 7121 moves along the second sliding rail 62, and the first scissor arm 711 and the second scissor arm 712 rotate relative to each other, so that the scissor unit 71 performs a scissor movement.

The scissor lift mechanism further includes an mounting shaft 77. The mounting shaft 77 is arranged between the two scissor units 71, the mounting shaft 77 is connected to the hinge between the first scissor arm 711 and the second scissor arm 712 and extends along hinge axes of the first scissor arm 711 and the second scissor arm 712, and the first transmission member 73 is mounted to the mounting shaft 77. The nut 76 is sleeved on the lead screw 75 and in a threaded fit with the lead screw 75, and the driving component 72 is configured to drive the lead screw 75 to rotate.

The first transmission member 73 is a roller 54 rotatably mounted to the mounting shaft 77, and the second transmission member 74 has an bevel 741 cooperating with the roller 54. The second transmission member 74 is fixed to the nut 76.

When it is necessary to drive the lifting platform 60 to ascend, the driving component 72 drives the lead screw 75 to rotate forwardly, the nut 76 moves forwardly along the lead screw 75, and the roller 54 performs a “climbing” movement relative to the bevel 741 of the second transmission member 74, such that the mounting shaft 77 ascends and the scissor unit 71 performs a scissor movement, so as to enable the scissor lift mechanism to drive the locking and unlocking mechanism 20 to ascend.

When it is necessary to drive the lifting platform 60 to descend, the driving component 72 drives the lead screw 75 to rotate reversely, the nut 76 moves reversely along the lead screw 75, and the roller 54 performs a “downhill” movement relative to the bevel 741 of the second transmission member 74, such that the mounting shaft 77 descends and the scissor unit 71 performs a scissor movement, so as to enable the scissor lift mechanism to drive the locking and unlocking mechanism 20 to descend.

The elevation mechanism 70 is configured to elevate the lifting platform 60, indirectly elevating the floating platform 10 and the positioning mechanism 30 arranged on the floating platform 10, so that the positioning member 32 of the positioning mechanism 30 is in locational fit with the electrical device, so as to position the floating platform 10 relative to the electrical device in place. The elevation mechanism 70 can elevate the floating platform 10 and the positioning mechanism 30 arranged on the floating platform 10 to different heights, so as to adapt to different electrical devices. Moreover, the floating platform 10 is floatingly connected to the lifting platform 60, so that the floating platform 10 can float relative to the lifting platform 60, and the locational fit between the positioning member 32 of the positioning mechanism 30 and the electrical device can be easily realized by floating the floating platform 10 relative to the lifting platform 60.

Figure 10:
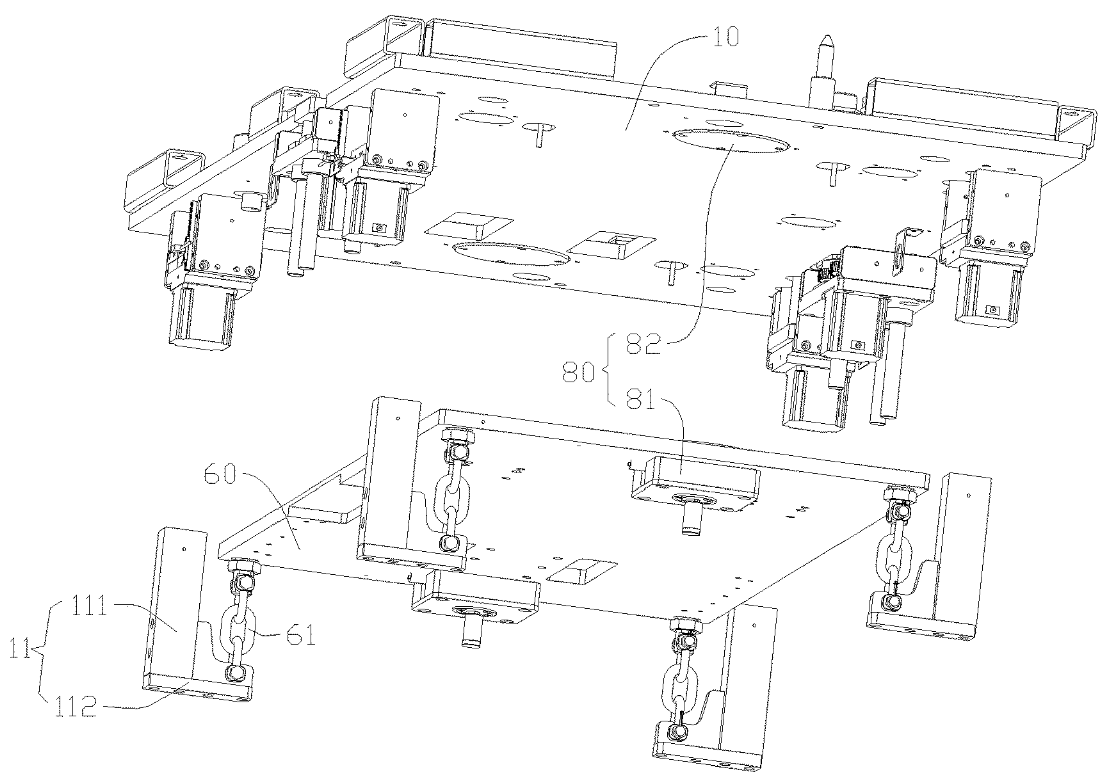
FIG. 10 is a schematic diagram of a floating platform not connected to a lifting platform.

Referring to FIG. 10, in some embodiments, the battery swap apparatus 100 further includes a locking assembly 80. The locking assembly 80 is configured to lock the floating platform 10 to the lifting platform 60 or to release the floating platform 10 from the lifting platform 60.

By locking the floating platform 10 to the lifting platform 60, it is meant that the floating platform 10 does not move relative to the lifting platform 60, rather than limiting that the floating platform 10 is fixed to the lifting platform 60.

The floating platform 10 may be statically suspended in the air relative to the lifting platform 60, that is, the floating platform 10 and the lifting platform 60 is not in direct contact, while the floating platform 10 does not move relative to the lifting platform 60. By releasing the floating platform 10 from the lifting platform 60, it is meant that the floating platform 10 can move relative to the lifting platform 60 in a plane parallel to the plane where the lifting platform 60 is located.

The locking assembly 80 is configured to lock the floating platform 10 to the lifting platform 60 or to release the floating platform 10 from the lifting platform 60, so that when it is necessary to position the positioning member 32 of the positioning mechanism 30 relative to the electrical device, the locking assembly 80 releases the floating platform 10 from the lifting platform 60 such that the floating platform 10 can float relative to the lifting platform 60, to position the positioning member 32 relative to the electrical device in place. During the process of locking the battery 2000 to the electrical device or unlocking the battery 2000 from the electrical device by the locking and unlocking mechanism 20 and during the process of transporting the battery 2000 by the battery swap apparatus 100, the locking assembly 80 locks the floating platform 10 to the lifting platform 60 so that the battery 2000 is stably placed on the floating platform 10, improving the stability of dismounting and mounting the battery 2000 and the stability of the transportation of the battery 2000.

There are many structural forms of the locking assembly 80. For example, in some embodiments, the locking assembly 80 includes an electromagnet 81 and a magnet attraction plate 82. The electromagnet 81 is arranged on one of the lifting platform 60 and the floating platform 10, and the magnet attraction plate 82 is arranged on the other of the lifting platform 60 and the floating platform 10.

As shown in FIG. 10, the electromagnet 81 is arranged on the lifting platform 60, and the magnet attraction plate 82 is arranged on the floating platform 10. When the electromagnet 81 is energized, a magnetic attraction force is generated to attract the magnet attraction plate 82, so as to lock the floating platform 10 to the lifting platform 60. When the electromagnet 81 is de-energized, the magnetic attraction force of the magnet attraction plate 82 disappears to release the floating platform 10 from the lifting platform 60. In other embodiments, it is also possible that the electromagnet 81 is arranged on the floating platform 10, and the magnet attraction plate 82 is arranged on the lifting platform 60.

Through the cooperation between the electromagnet 81 and the magnet attraction plate 82, the locking of the floating platform 10 to the lifting platform 60 or the releasing of the floating platform 10 from the lifting platform 60 has a fast action response, and the floating platform 10 can be locked to the lifting platform 60 or the floating platform 10 released from the lifting platform 60 in a timely manner, improving the swapping efficiency of the battery 2000.

Figure 11:
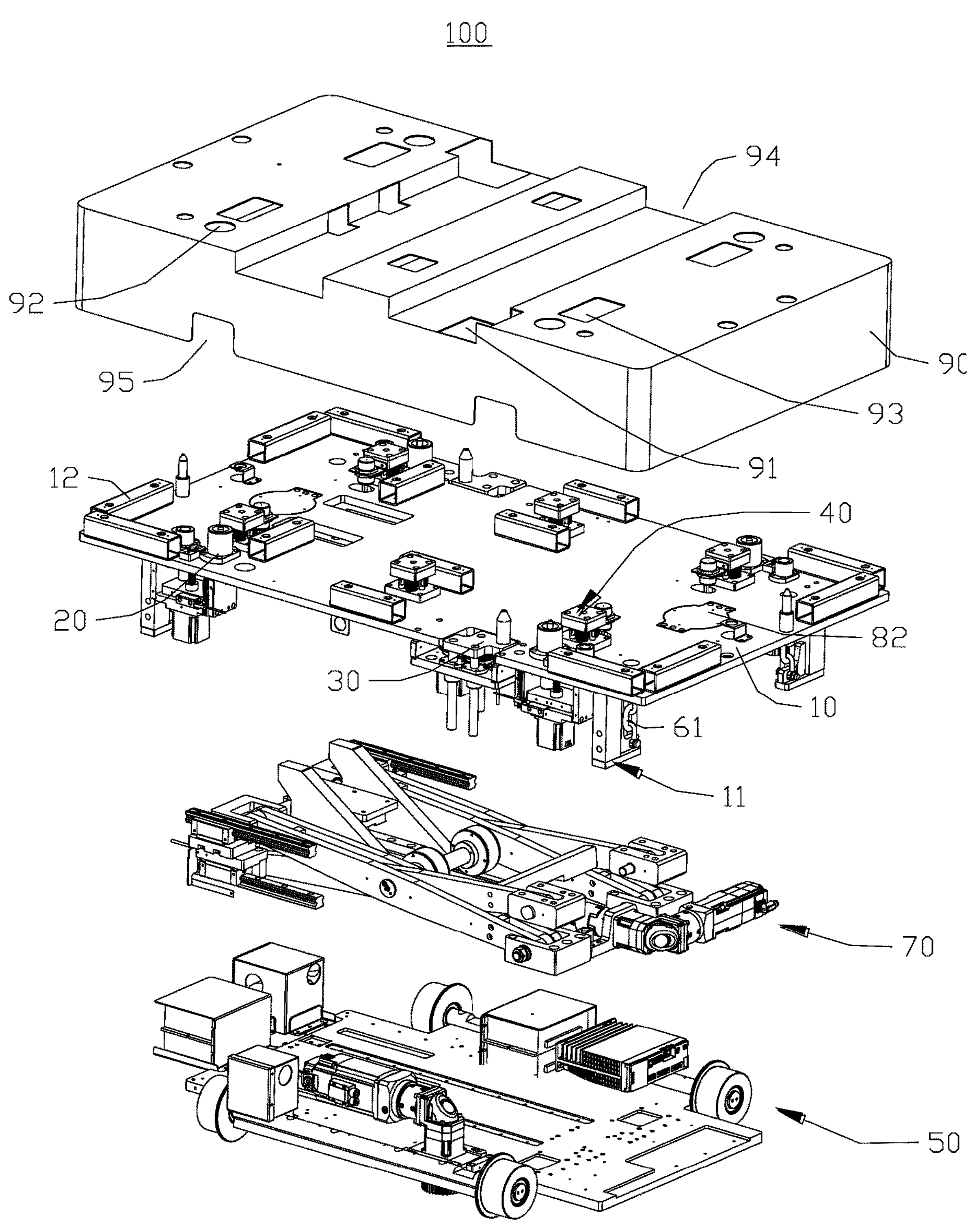
FIG. 11 is an exploded view of a battery swap apparatus provided in still some embodiments of the present application.
Figure 12:
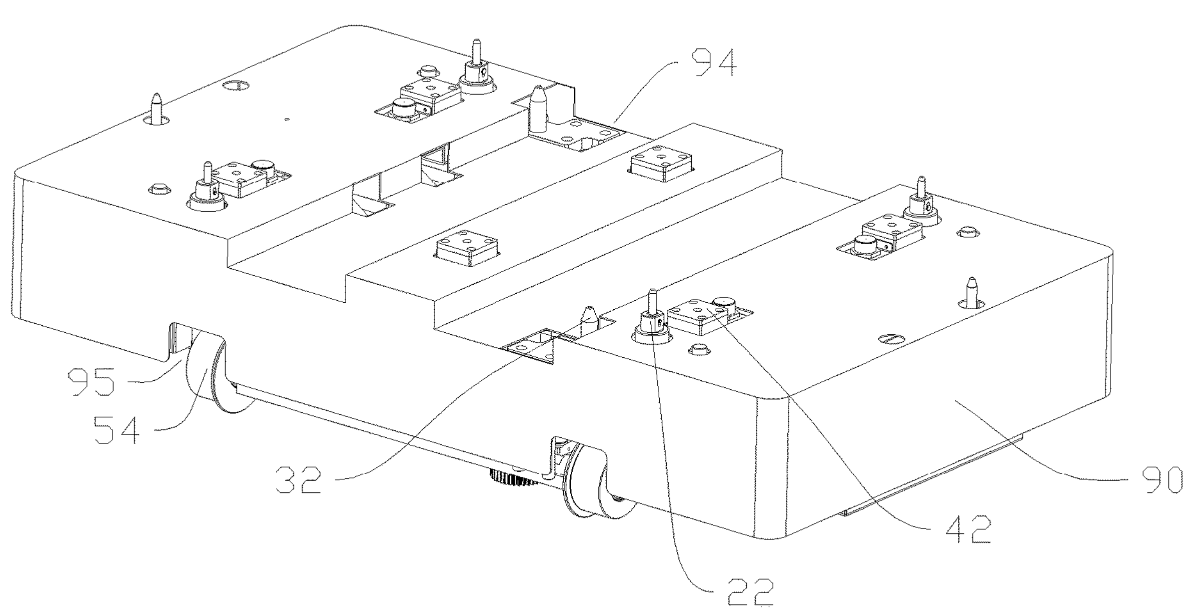
FIG. 12 is a schematic structural diagram of a battery swap apparatus provided in still some embodiments of the present application.
Figure 13:
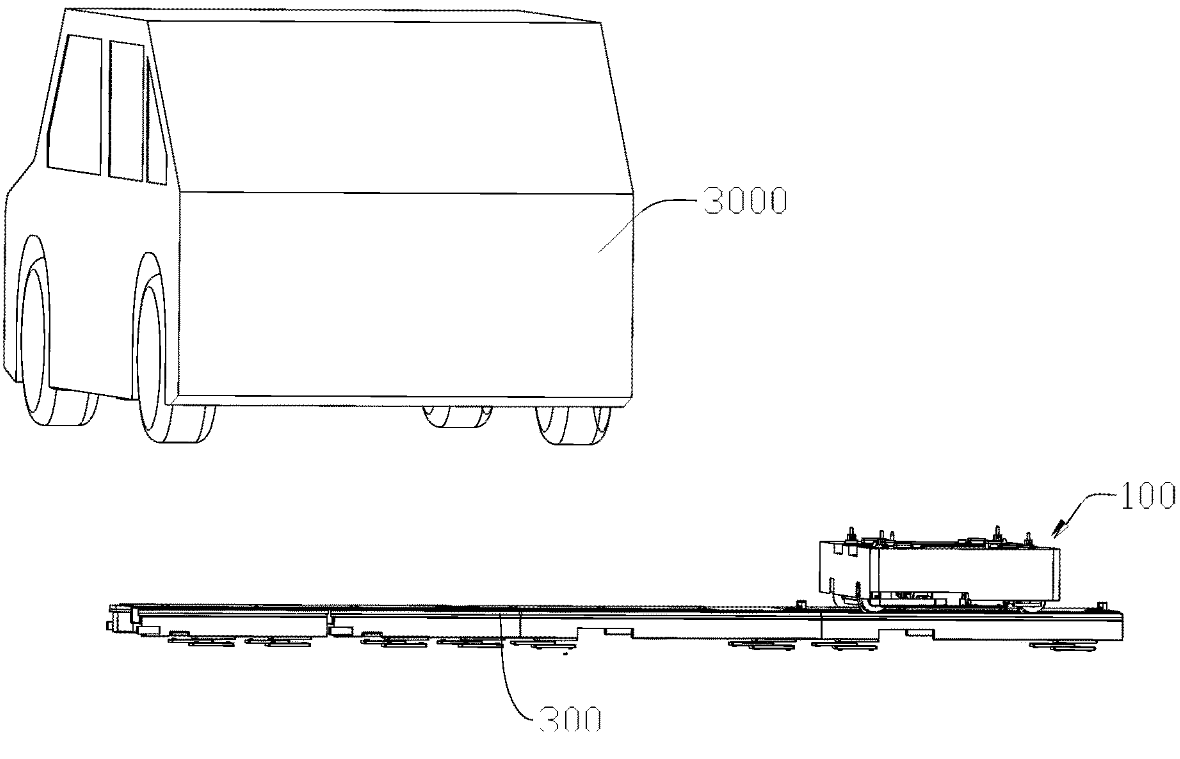
FIG. 13 is a schematic diagram of an elevated vehicle.
Figure 14:
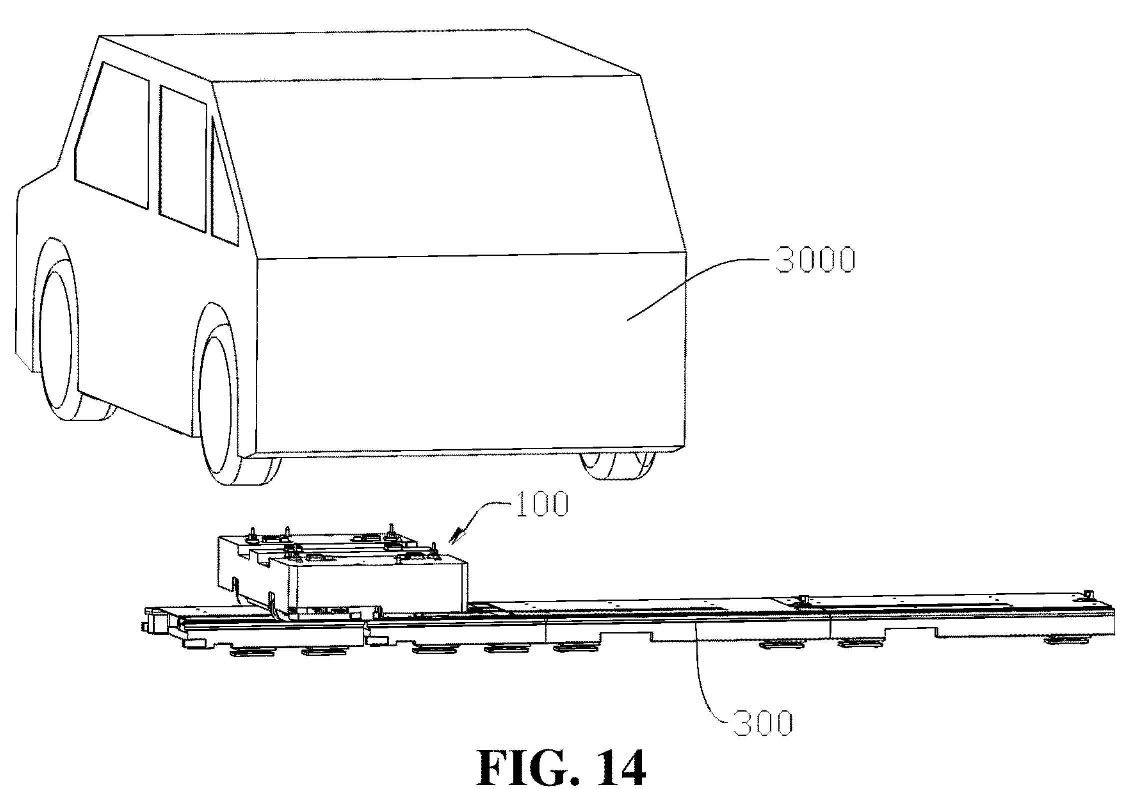
FIG. 14 is a schematic diagram of a battery swap apparatus moving to the bottom of a vehicle.
Figure 15:
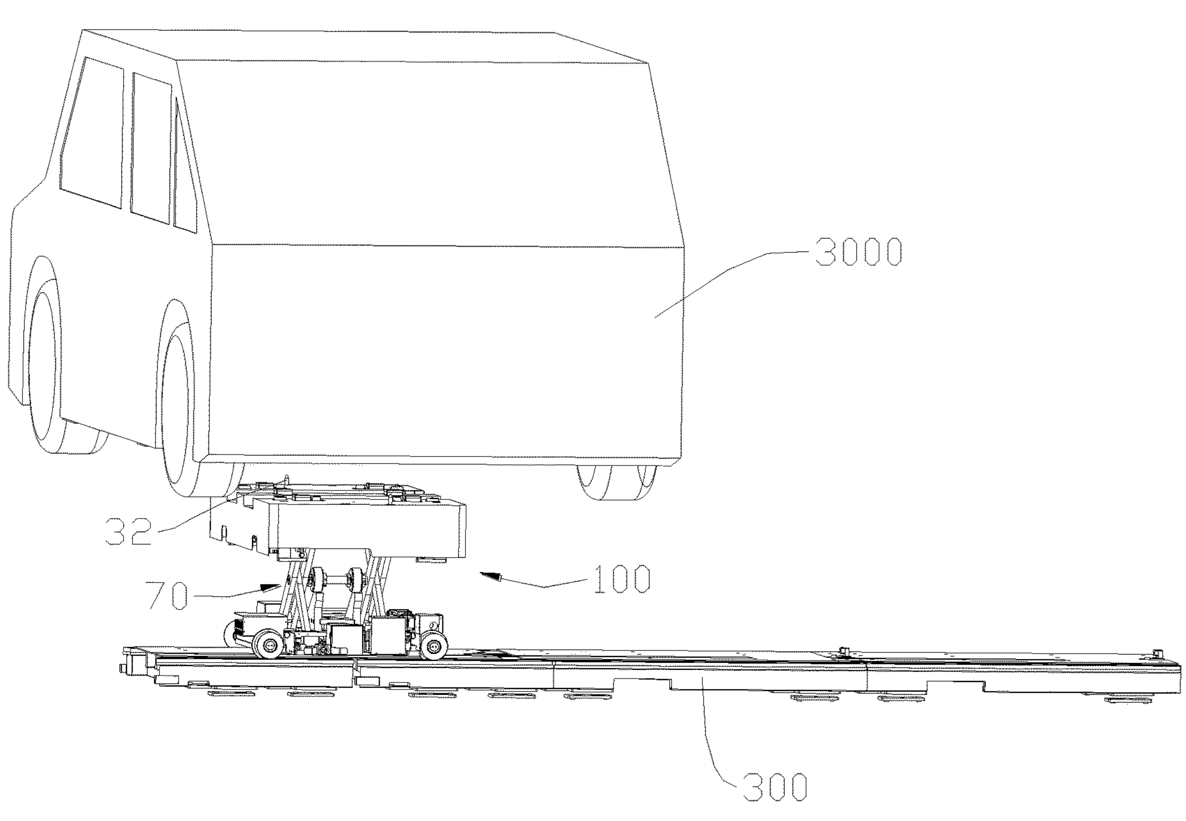
FIG. 15 is a schematic diagram of an elevation mechanism driving a lifting platform to ascend and a positioning member to ascend.
Figure 16:
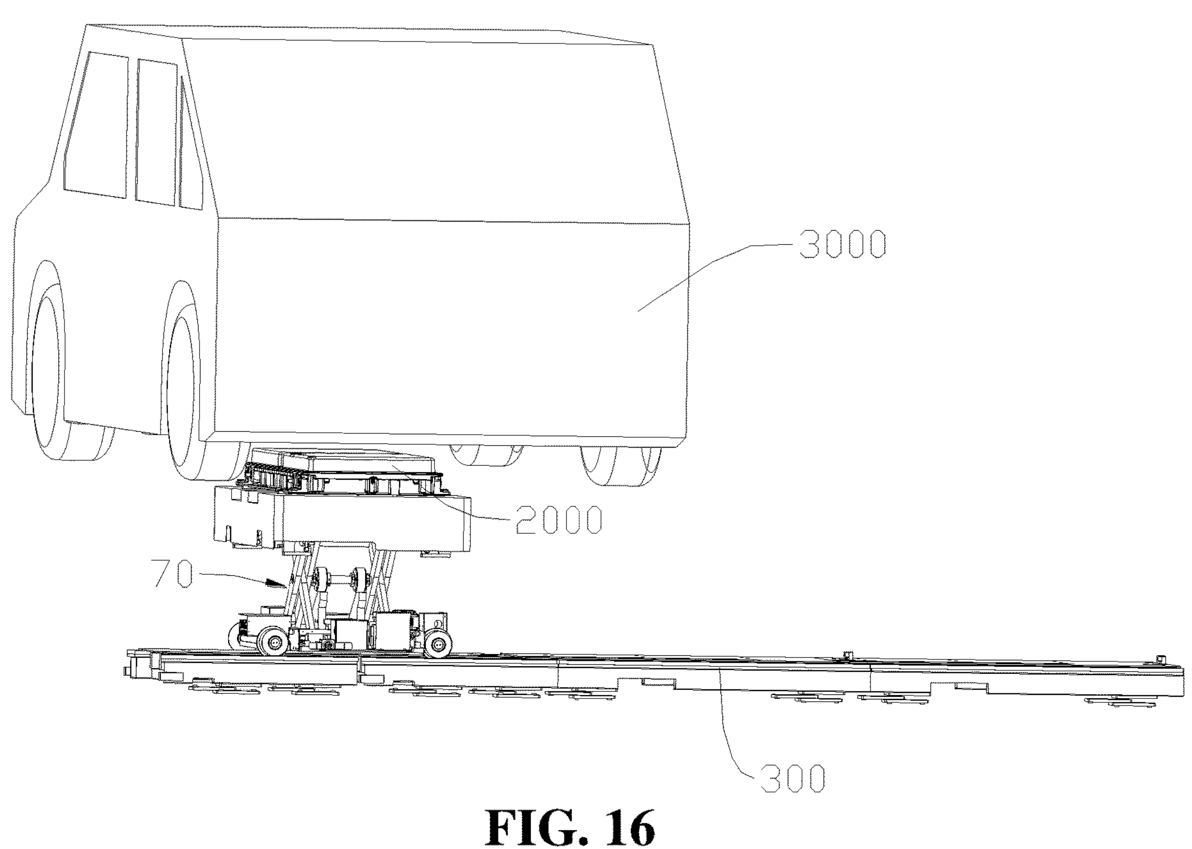
FIG. 16 shows a vehicle-mounted battery being unlocked from a vehicle.
Figure 17:
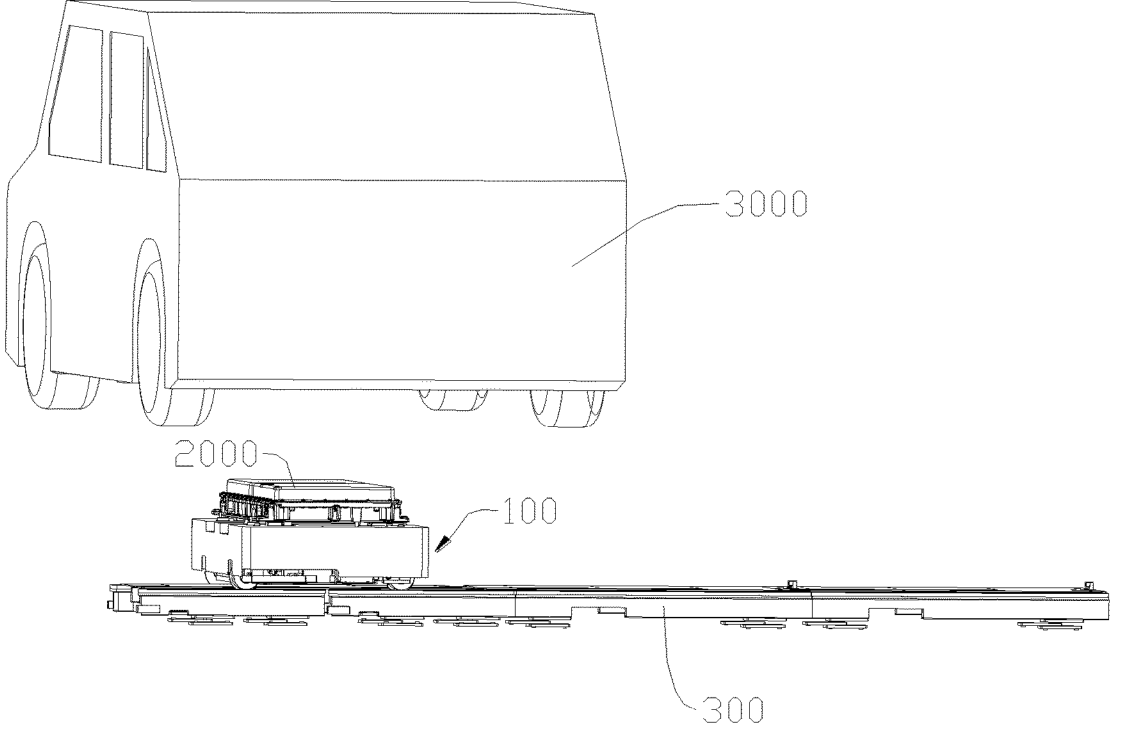
FIG. 17 is a schematic diagram of an elevation mechanism driving a lifting platform to descend and the positioning member to descend.
Figure 18:
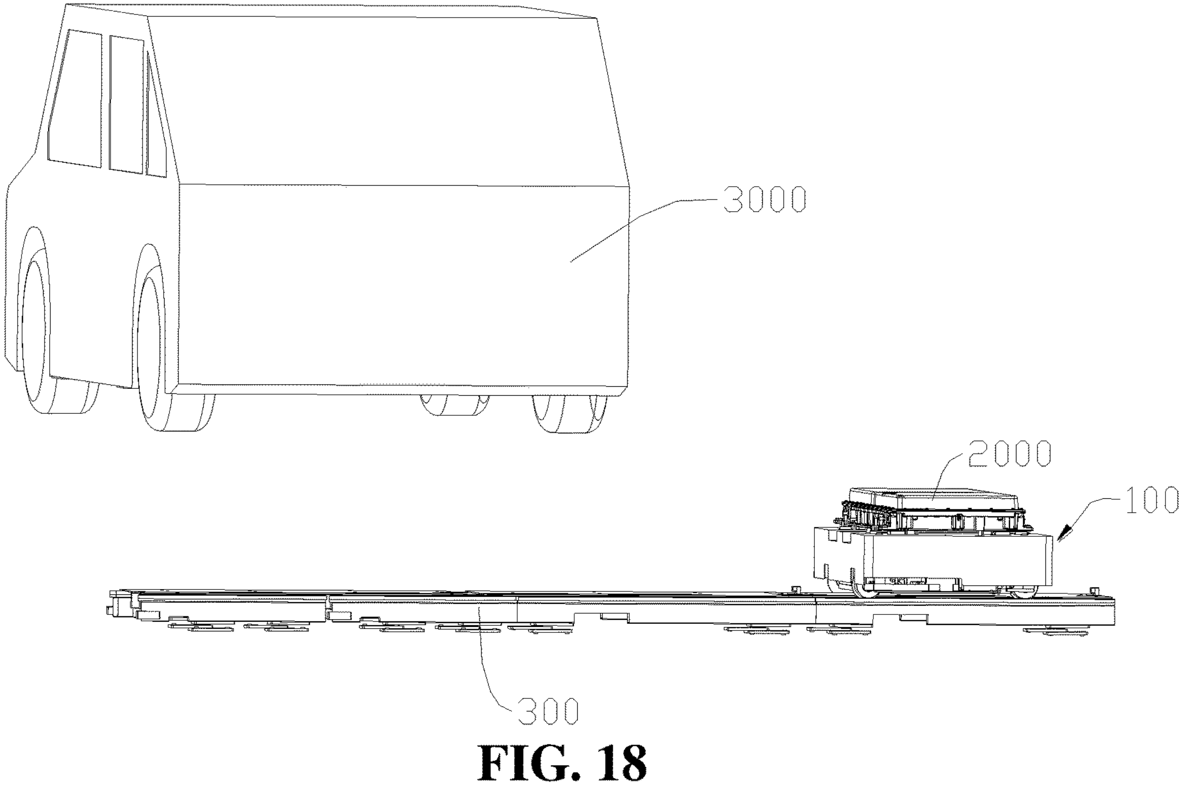
FIG. 18 is a schematic diagram of a battery swap apparatus transporting the battery away.

Referring to FIGS. 11 and 12, in some embodiments, the battery swap apparatus 100 further includes a protective enclosure 90. The protective enclosure 90 covers the top of the floating platform 10 and is fixed to a fixed block 12 provided on the floating platform 10. This can ensure a clean appearance and prevent the battery swap apparatus 100 from being polluted by water or dust.

The protective enclosure 90 is provided with a first opening 91 through which the positioning member 32 extends, a second opening 92 through which the locking and unlocking mechanism 20 extends, and a third opening 93 through which the supporting member 42 extends. The driving member 31 drives the positioning member 32 to extend out of the first opening 91 to be in locational fit with the electrical apparatus so as to position the floating platform 10 relative to the electrical device in place. The unlocking mechanism extends out of the second opening 92 to lock the battery 2000 to the electrical device or unlock the battery 2000 from the electrical device. The supporting member 42 extends out of the third opening 93 to support the battery 2000.

The outer surface of the protective enclosure 90 facing is also provided with slots 94. The slots 94 are configured to allow for the insertion of the forks 210 to pick and place the battery 2000. The protective enclosure 90 is further provided with notches 95 for avoiding the rollers 54 of the movable base 50.

Embodiments of the present application provide a battery swap apparatus 100. The battery swap apparatus 100 includes a floating platform 10, a locking and unlocking mechanism 20, a positioning mechanism 30, a supporting mechanism 40, a movable base 50, a lifting platform 60, an elevation mechanism 70 and a locking assembly 80.

The positioning mechanism 30 and the supporting mechanism 40 are both mounted to the floating platform 10. The floating platform 10 is floatingly connected to the lifting platform 60. The elevation mechanism 70 is connected between the lifting platform 60 and the movable base 50 for elevating the lifting platform 60. The locking assembly 80 is configured to lock the floating platform 10 to the lifting platform 60 or to release the lifting platform 60 from the floating platform 10.

The positioning mechanism 30 includes a driving member 31, a positioning member 32, a transmission assembly 33, a first mounting seat 34, a connecting plate 35, a first guide shaft 36 and a first detection unit 37. The first mounting seat 34 is fixed to the floating platform 10. The transmission assembly 33 includes a first gear 331, a second gear 332 and a lead screw 333. The first gear 331 is connected to an output end of the driving member 31, the first gear 331 meshes with the second gear 332, and the second gear 332 is sleeved on the lead screw 333 and threadedly connected to the lead screw 333, and the positioning member 32 is indirectly connected to the lead screw 333 via the connecting plate 35. The first guide shaft 36 slidably passes through a first guide hole 341 of the first mounting seat 34 and is connected to the connecting plate 35. The driving member 31 is in transmission connection with the positioning member 32 via the transmission assembly 33, so as to drive the positioning member 32 to move in the height direction of the battery swap apparatus 100. The first detection unit 37 is configured to detect height information of the positioning member 32.

The supporting mechanism 40 includes a second mounting seat 41, a supporting member 42, an elastic member 43, a second guide shaft 44 and a second detection unit 45. The second mounting seat 41 is fixed to the floating platform 10, the elastic member 43 is elastically supported between the supporting member 42 and the second mounting seat 41, and the supporting member 42 is configured to support the battery 2000. The second guide shaft 44 slidably passes through a second guide hole 411 of the second mounting seat 41 and is connected to the supporting member 42. The second detection unit 45 is configured to detect whether the supporting member 42 is in contact with the battery 2000.

The locking assembly 80 includes an electromagnet 81 arranged on the lifting platform 60 and an electromagnet 81 attraction plate arranged on the floating platform 10. The electromagnet 81 and the electromagnet 81 attraction plate cooperate with each other to lock the floating platform 10 to the lifting platform 60 or release the floating platform 10 from the lifting platform 60.

The operating principle of the battery swap apparatus 100 is as follows: when it is necessary to remove the battery 2000 from the electrical device, the floating platform 10 is unlocked from the lifting platform 60 by means of the locking assembly 80, the elevation mechanism 70 elevates the lifting platform 60, and the driving member 31 drives the positioning member 32 to ascend, such that the positioning member 32 is in locational fit with the electrical device, and the battery 2000 is supported by the supporting member 42. The floating platform 10 is locked to the lifting platform 60 by means of the locking assembly 80. The locking and unlocking mechanism 20 operates to remove the battery 2000 from the electrical device until the battery 2000 is completely separated from the electrical device. The elevation mechanism 70 lowers the lifting platform 60, and the driving member 31 drives the positioning member 32 to descend, such that the positioning member 32 is separated from the electrical device, and the gear 53 and the rollers 54 of the movable base 50 rotate to drive the battery swap apparatus 100 to move, thereby transferring the battery 2000.

When it is necessary to mount the battery 2000 to the electrical device, the floating platform 10 is locked to the lifting platform 60 by means of the locking assembly 80, the elevation mechanism 70 lowers the lifting platform 60 to the lowest point, and the battery 2000 is supported on the supporting member 42. The gear 53 and the rollers 54 of the movable base 50 rotate to drive the battery swap apparatus 100 carrying the battery 2000 to move to the battery swap apparatus 100. The floating platform 10 is unlocked from the lifting platform 60 by means of the locking assembly 80, the elevation mechanism 70 elevates the lifting platform 60, and the driving member 31 drives the positioning member 32 to ascend, such that the positioning member 32 is in locational fit with the electrical device, and the battery 2000 is aligned with a mounting position of the electrical device. The locking and unlocking mechanism 20 operates to mount the battery 2000 to the electrical device. The elevation mechanism 70 lowers the lifting platform 60, and the driving member 31 drives the positioning member 32 to descend.

Embodiments of the present application also provide a battery swap system 1000. The battery swap system 1000 includes a track 300, a battery swap platform 400, a battery pick-and-place apparatus 200, and a battery swap apparatus 100 provided in any of the embodiments described above. The battery swap apparatus 100 is movably arranged on the track 300; the battery swap platform 400 is located at one end of the track 300; and the battery pick-and-place apparatus 200 is located at the other end of the track 300.

The battery swap platform 400 is configured to park the vehicle, and the battery 2000 of the vehicle is swapped on the battery swap platform 400. The battery swap platform 400 is configured to lift the vehicle, to locate the vehicle above the battery swap platform 400. The battery pick-and-place apparatus 200 is configured to remove the battery 2000 to be charged from the battery swap apparatus 100 or to put the battery 2000 on the battery swap apparatus 100.

The operating process of the battery swap system 1000 will be described by taking an exhausted battery 2000 removed from a vehicle 3000 as an example.

As shown in FIGS. 13-18, the vehicle 3000 is parked on the battery swap platform 400 and the vehicle 3000 is lifted off the ground by the battery swap platform 400. The battery swap apparatus 100 moves along the track 300 to a position directly facing the battery 2000, below the vehicle 3000. The scissor elevation mechanism 70 drives the lifting platform 60 to ascend, and the driving member 31 drives the positioning member 32 to ascend and extend out of the protective enclosure 90 until the positioning member 32 is positioned relative to the vehicle 3000 in place. The battery 2000 is unlocked from the vehicle 3000 by the locking and unlocking mechanism 20, and the battery 2000 is completely dropped to the battery swap apparatus 100. After the battery 2000 is completely dropped to the battery swap apparatus 100, the scissor elevation mechanism 70 drives the locking and unlocking mechanism 20 to descend such that the battery 2000 is completely separated from the vehicle 3000, and the driving member 31 drives the positioning member 32 to descend. The battery swap apparatus 100 moves along the track 300 to the battery pick-and-place apparatus 200, and the battery pick-and-place apparatus 200 removes the battery 2000 from the battery swap apparatus 100.

What are described above are only preferred embodiments of the present application and are not intended to limit the present application. For those skilled in the art, the present application may have various modifications and changes. Any modifications, equivalent substitutions, improvements, etc. made within the spirit and principles of the present application shall fall into the scope of protection of the present application.

The invention claimed is:

1. A battery swap apparatus for swapping a battery of an electrical device comprising:

a floating platform;

a locking and unlocking mechanism, arranged on the floating platform and configured to lock the battery to the electrical device or to unlock the battery from the electrical device; and a positioning mechanism, arranged on the floating platform and configured to position the floating platform relative to the electrical device;

the positioning mechanism comprises a positioning member and a driving member, the driving member being configured to drive the positioning member to move in a height direction of the battery swap apparatus, so as to adjust the height of the positioning member;

the positioning mechanism comprises a transmission assembly, and the driving member is in transmission connection with the positioning member via the transmission assembly; and the transmission assembly is configured to convert a rotation of an output end of the driving member into a linear movement of the positioning member; and the transmission assembly comprises a first gear, a second gear and a lead screw, the first gear meshes with the second gear, the first gear is connected to the output end of the driving member, the second gear is sleeved on the lead screw and threadedly connected to the lead screw, and the positioning member is connected to the lead screw; and a rotation axis of the first gear, a rotation axis of the second gear and an axis of the lead screw are all consistent with the height direction of the battery swap apparatus.

2. The battery swap apparatus according to claim 1, wherein the positioning mechanism further comprises a first mounting seat, a connecting plate and a first guide shaft, wherein the mounting seat is fixed to the floating platform; the driving member, the first gear and the second gear are all mounted to the mounting seat; and the connecting plate is connected to the lead screw, the positioning member is connected to the connecting plate, and the first guide shaft slidably passes through the first mounting seat and is connected to the connecting plate.

3. The battery swap apparatus according to claim 1, wherein the positioning mechanism further comprises a first detection unit configured to detect height information of the positioning member.

4. The battery swap apparatus according to claim 1, further comprising a supporting mechanism, the supporting mechanism comprising a second mounting seat, a supporting member and an elastic member, wherein the second mounting seat is fixed to the floating platform, the elastic member is elastically supported between the supporting member and the second mounting seat, and the supporting member is configured to support the battery.

5. The battery swap apparatus according to claim 4, wherein the supporting mechanism further comprises a second guide shaft, the second guide shaft slidably passing through the second mounting seat and being connected to the supporting member.

6. The battery swap apparatus according to claim 4, wherein the supporting mechanism further comprises a second detection unit configured to detect whether the supporting member is in contact with the battery.

7. The battery swap apparatus according to claim 1, further comprising:

a movable base;

a lifting platform, to which the floating platform is floatingly connected; and an elevation mechanism arranged between the movable base and the lifting platform and configured to elevate the lifting platform.

8. The battery swap apparatus according to claim 7, further comprising a locking assembly configured to lock the floating platform to the lifting platform or to release the floating platform from the lifting platform.

9. The battery swap apparatus according to claim 8, wherein the locking assembly comprises an electromagnet and a magnet attraction plate, wherein the electromagnet is arranged on one of the lifting platform and the floating platform, and the magnet attraction plate is arranged on the other one of the lifting platform and the floating platform.

10. A battery swap system, comprising:

a track;

the battery swap apparatus of claim 1, which is movably arranged on the track;

a battery swap platform located at one end of the track; and a battery pick-and-place apparatus located at the other end of the track.

* * * * *